United States Patent
Wang et al.

(10) Patent No.: US 8,402,454 B2
(45) Date of Patent: *Mar. 19, 2013

(54) IN-SERVICE SOFTWARE UPGRADE ON CARDS OF VIRTUAL PARTITION OF NETWORK ELEMENT THAT INCLUDES DIRECTING TRAFFIC AWAY FROM CARDS OF VIRTUAL PARTITION

(75) Inventors: Dawei Wang, Mountain View, CA (US); Rajeev Gupta, Sunnyvale, CA (US); Renhua Wen, San Ramon, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 238 days.

This patent is subject to a terminal disclaimer.

(21) Appl. No.: 12/888,405

(22) Filed: Sep. 22, 2010

(65) Prior Publication Data
US 2012/0072894 A1    Mar. 22, 2012

(51) Int. Cl.
G06F 9/44    (2006.01)
(52) U.S. Cl. ........ 717/172; 717/103; 717/168; 717/171; 717/177; 709/224; 709/238; 709/250
(58) Field of Classification Search .................. None
See application file for complete search history.

(56) References Cited

U.S. PATENT DOCUMENTS

| | | | |
|---|---|---|---|
| 4,768,188 A * | 8/1988 | Barnhart et al. | 370/434 |
| 5,134,691 A * | 7/1992 | Elms | 709/209 |
| 5,664,231 A | 9/1997 | Postman et al. | 710/73 |
| 6,170,021 B1 * | 1/2001 | Graf | 710/15 |
| 6,216,170 B1 | 4/2001 | Giovannoni et al. | |
| 6,363,488 B1 * | 3/2002 | Ginter et al. | 726/1 |
| 6,832,336 B2 | 12/2004 | Lal | |
| 7,076,570 B2 | 7/2006 | Ahrens et al. | |
| 7,352,748 B1 | 4/2008 | Rozario et al. | |
| 7,406,038 B1 * | 7/2008 | Oelke et al. | 370/225 |
| 7,539,131 B2 | 5/2009 | Shen | |
| 7,685,254 B2 * | 3/2010 | Pandya | 709/217 |
| 8,243,729 B2 | 8/2012 | Subramanian et al. | |

(Continued)

FOREIGN PATENT DOCUMENTS
WO    WO2006/136193    12/2006

OTHER PUBLICATIONS

Title: Development of real-time simulator using traffic monitoring, author: Saito, H et al, dated: 2000, source: IEEE.*

(Continued)

*Primary Examiner* — Chameli Das
(74) *Attorney, Agent, or Firm* — Blakely Sokoloff Taylor & Zafman LLP

(57) ABSTRACT

A method within network element, for directing traffic away from cards of first virtual partition, before changing software on cards of first virtual partition, until after cards of first virtual partition have session data, while network element services sessions. Redistribute sessions, serviced by cards of first virtual partition, to cards of second virtual partition. Each of virtual partitions has control card and line card. Direct traffic away from cards of first virtual partition, prior to taking line card of first virtual partition offline. After redistributing sessions, change software on line card of first virtual partition, while cards of second virtual partition service sessions, including redistributed sessions. After changing software, synchronize session data, for sessions serviced by cards of second virtual partition to cards of first virtual partition. Traffic is directed away from cards before changing software on line card, and until after synchronizing session data to cards of first partition.

20 Claims, 16 Drawing Sheets

U.S. PATENT DOCUMENTS

| | | | |
|---|---|---|---|
| 2002/0091844 A1* | 7/2002 | Craft et al. | 709/230 |
| 2002/0131436 A1* | 9/2002 | Suri | 370/419 |
| 2002/0147839 A1* | 10/2002 | Boucher et al. | 709/238 |
| 2003/0126195 A1 | 7/2003 | Reynolds et al. | |
| 2003/0208632 A1* | 11/2003 | Rimmer | 709/250 |
| 2005/0114234 A1* | 5/2005 | Thomas et al. | 705/28 |
| 2005/0198375 A1* | 9/2005 | Hwang et al. | 709/238 |
| 2006/0072480 A1 | 4/2006 | Deval et al. | |
| 2007/0083625 A1* | 4/2007 | Chamdani et al. | 709/223 |
| 2009/0089774 A1 | 4/2009 | Lynch et al. | |
| 2010/0039932 A1 | 2/2010 | Wen et al. | |
| 2010/0042712 A1 | 2/2010 | Lindem et al. | |
| 2010/0042869 A1 | 2/2010 | Szabo et al. | |
| 2010/0174770 A1* | 7/2010 | Pandya | 709/200 |
| 2010/0281157 A1* | 11/2010 | Ramankutty et al. | 709/224 |

OTHER PUBLICATIONS

Title: On the Line Card Collection Model for Bandwidth Utilization and Latency Measurement in High-speed IP Networks, Zhang yi' yi et al, dated: 2007, source: IEEE.*

Non-Final Office Action, U.S. Appl. No. 12/888,402, dated Aug. 17, 2012, 13 pages.

* cited by examiner

IN-SERVICE SOFTWARE UPGRADE ON CARDS OF VIRTUAL PARTITION OF NETWORK ELEMENT THAT INCLUDES DIRECTING TRAFFIC AWAY FROM CARDS OF VIRTUAL PARTITION

CROSS-REFERENCE TO RELATED APPLICATIONS

This application is related to U.S. patent application Ser. No. 12/888,402, filed Sep. 22, 2010, which is hereby incorporated by reference.

FIELD

Embodiments of the invention relate to the field of network elements; and more specifically, to upgrading software on the network elements.

BACKGROUND

Periodically the software on network elements may be upgraded or changed. Various approaches are known in the arts for upgrading the software on the network elements.

One known technique is described in U.S. Patent Application 20090089774, entitled "IN-SERVICE SOFTWARE UPGRADE UTILIZING METADATA-DRIVEN STATE TRANSLATION," filed on Jan. 18, 2008, by Timothy J. Lynch. This application discloses in part an "in-service" upgrade where new software is first installed and initialized on a backup or standby controller. The network element state is synchronized to the backup controller and control is switched to the backup controller. In this algorithm, the backup controller becomes the active controller for the network element and the former active controller is the backup controller. It is also disclosed that the network element uses metadata to translate the active state to the format used by the new software.

SUMMARY

In one aspect, a method is disclosed. The method is performed within a network element, for directing traffic away from cards of a first virtual partition, before changing software on the cards of the first virtual partition, until after the cards of the first virtual partition have session data, and while the network element services sessions. The method includes redistributing sessions, currently serviced by the cards of the first virtual partition of the network element, to cards of a second virtual partition of the network element. Each of the first and second virtual partitions has at least one control card and at least one line card. The traffic is directed away from the cards of the first virtual partition, prior to taking the at least one line card of the first virtual partition offline. After redistributing the sessions, from the cards of the first virtual partition to the cards of the second virtual partition, the software is changed on, at least, the at least one line card of the first virtual partition. This is performed while the cards of the second virtual partition service sessions, including the sessions redistributed from the cards of the first virtual partition. After changing the software on the at least one line card of the first virtual partition, session data is synchronized, for sessions currently serviced by the cards of the second virtual partition, from the cards of the second virtual partition, to the cards of the first virtual partition. Notably, the traffic is directed away from the cards of the first virtual partition before changing the software on the at least one line card of the first virtual partition, and continues until after the synchronizing of the session data from the cards of the second virtual partition to the cards of the first virtual partition. Advantageously, as a result, speed of traffic movement away from the cards of the first virtual partition is increased by directing the traffic away from the first virtual partition prior to the taking of the at least one line card of the first virtual partition offline. Also advantageously, the traffic is directed away from the cards of the first virtual partition until after the cards of the first virtual partition have session data to handle the traffic.

In another aspect, a network element is disclosed. The network element is operable to direct traffic away from a first set of one or more line cards, before upgrading software on the first set of the line cards, until after the first set of the line cards have session data, and while the network element services sessions. The network element includes a plurality of control cards coupled together, and a plurality of line cards coupled with the control cards and coupled together. Each of the line cards has line card software. The network element also includes an interface to receive an in-service software upgrade (ISSU) command, and an ISSU system that, responsive to the ISSU command, is operable to cause the network element to perform operations. The operations include an operation to direct traffic away from the first set of one or more of the line cards, prior to taking the first set of the line cards offline. The operations also include an operation to upgrade the line card software on the first set of the line cards, after taking the first set of the line cards offline, and while a second set of one or more of the line cards is online and operable to receive traffic associated with the sessions serviced by the network element. Also, the operations include an operation to bring the first set of the line cards online, after the line card software has been upgraded on the first set of the line cards. The network element is operable to direct the traffic away from the first set of the line cards, prior to upgrading the line card software on the first set of the line cards, and until after the session data for the sessions serviced by the network element is available to the first set of the line cards. Advantageously, as a result, speed of traffic movement away from the first set of the line cards is increased by the directing of the traffic away from the first set of the line cards, prior to taking the first set of the line cards offline. Also, advantageously, the traffic is directed away from the first set of the line cards until after session data to handle the traffic is available to the first set of the line cards.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
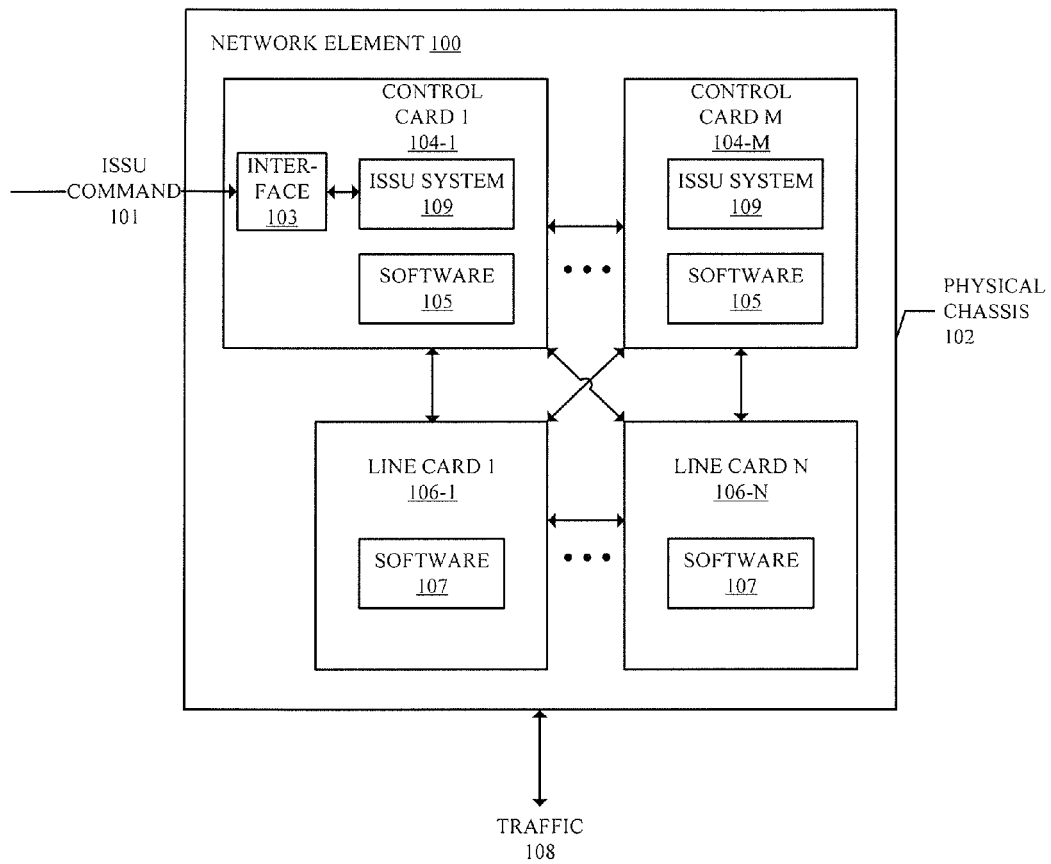
FIG. 1 is a block diagram illustrating an example embodiment of a network element.

FIG. 1 is a block diagram illustrating an example embodiment of a network element 100. As used herein, a network element (e.g., a router, switch, bridge, or combination (e.g., multiple services network element)) is a piece of networking equipment, including hardware and software, that communicatively interconnects other equipment on the network (e.g., other network elements, end stations). Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data.

Typically, a network element includes a set of one or more line cards, a set of one or more control cards, and optionally a set of one or more service cards (sometimes referred to as resource cards). In some cases, the service cards may be implemented as control cards. These cards are coupled together through one or more mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, Internet Protocol Security (IPsec), Peer-to-peer (P2P)), Voice over Internet Protocol (VoIP) Session Border Controller, Mobile Wireless Gateways (Evolved Packet System (EPS) Gateway)). By way of example, a service card may be used to terminate IPsec tunnels and execute the attendant authentication and encryption algorithms.

Figure 15:
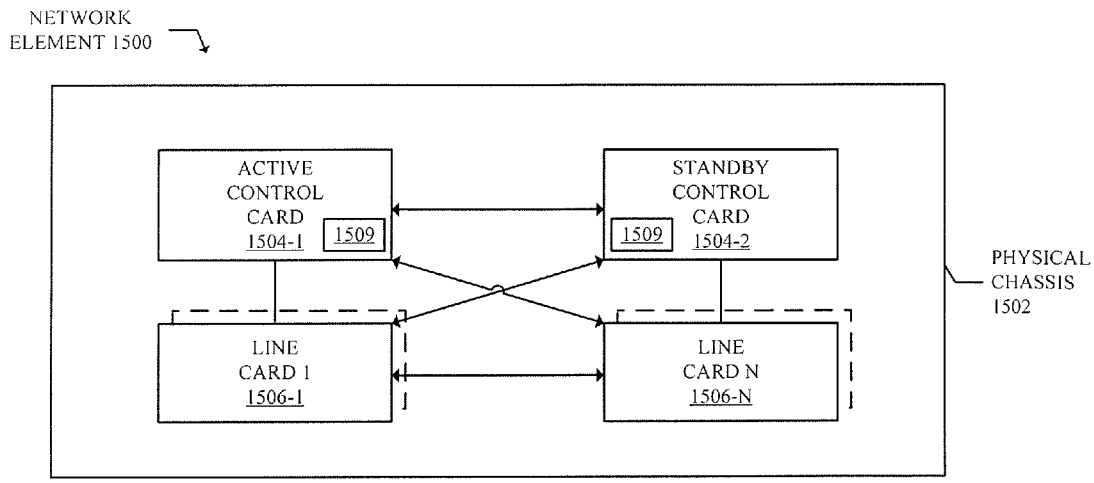
FIG. 15 is a block diagram illustrating an example embodiment of a network element having a first example embodiment of a control plane.
Figure 16:
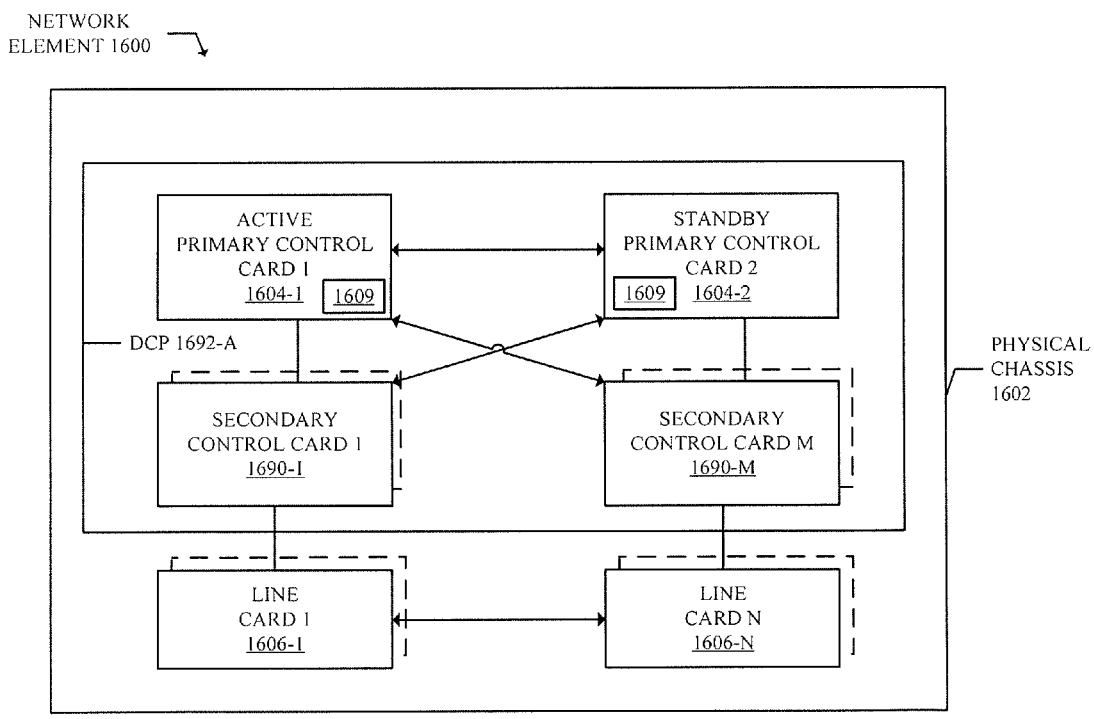
FIG. 16 is a block diagram illustrating an example embodiment of a network element having a second example embodiment of a control plane, which is a distributed control plane.

Referring to the example embodiment of the network element 100 of FIG. 1, the network element includes control cards, including at least a control card 1 104-1 and a control card M 104-M, and optionally one or more other control cards. The control cards are coupled together. The network element also includes line cards, including at least a line card 1 106-1 and a line card N 106-N, and optionally one or more other line cards. The line cards are coupled with the control cards, and the line cards are coupled together. The control cards and the line cards of the network element may belong to, or be coupled with, a single physical chassis 102. FIGS. 15 and 16 discussed further below are example embodiments of particular suitable configurations for the control plane of the network element 100 of FIG. 1.

Each of the control cards has control card software 105, and each of the line cards has line card software 107. At times, it may be appropriate to upgrade or change the software on the control cards, or to upgrade or change the software on the line cards, or to upgrade or change the software on both the control and line cards. Moreover, it is often desirable to upgrade or change the software on the cards of the network element without causing system inaccessibility, interrupting service, or losing traffic.

Methods and apparatus for performing an in-service software upgrade (ISSU) on cards of the network element 100 are disclosed herein. The term software upgrade is to be interpreted broadly as a software change. By way of example, the upgrading of the software may include changing the software to implement new features or functionalities, changing the software to perform maintenance on the software, or changing the software by adding patches or fixes to the software, to name just a few examples.

Referring again to FIG. 1, in one embodiment an ISSU command 101 may be provided to the network element 100 to initiate the ISSU on the network element. The network element has an interface 103 to receive the ISSU command. The network element also has an ISSU system 109. The ISSU system, responsive to the ISSU command, is operable to cause the network element to perform the ISSU to change or upgrade the software on both control and line cards thereof, while the network element services sessions.

An example embodiment of the interface 103 is a command line interface (CLI). In the illustration, the interface is shown as part of the control card 1 104-1, such as, for example, an Ethernet connection to the control card 1. Alternatively, the interface may be provided through a line card, for example via a message from an external network that also carries the traffic 108, or the interface may be another type of interface on which control or management commands may be provided to the network element. In one aspect, a network administrator or other practitioner may issue the ISSU command 101 to the network element from a remote terminal or computer end station through an intervening network. The ISSU command may be issued either in-band or out-of-band. The ISSU command may be communicated over the intervening network from the remote terminal or computer end station to the network element. Accordingly, the ISSU command may potentially be issued to the network element from a remote location across a network, although the scope of the invention is not limited in this respect.

As will be explained further below, in some embodiments, performing the ISSU may include virtually partitioning the control and line cards of the network element into two or more virtual partitions. In one or more embodiments, the ISSU command may specify which control and line cards are to be included in each virtually partition. For example, the ISSU command may specify that one or more control cards (e.g., control card 1) and one or more line cards (e.g., line card 1) are to be included in a first virtual partition or virtual partition A, and the ISSU command may specify that one or more other control cards (e.g., control card M) and one or more other line cards (e.g., line card N) are to be included in a second virtual partition or virtual partition B. In other words, the ISSU command may associate particular control and line cards with particular virtual partitions in which they are to be included.

Figure 2:
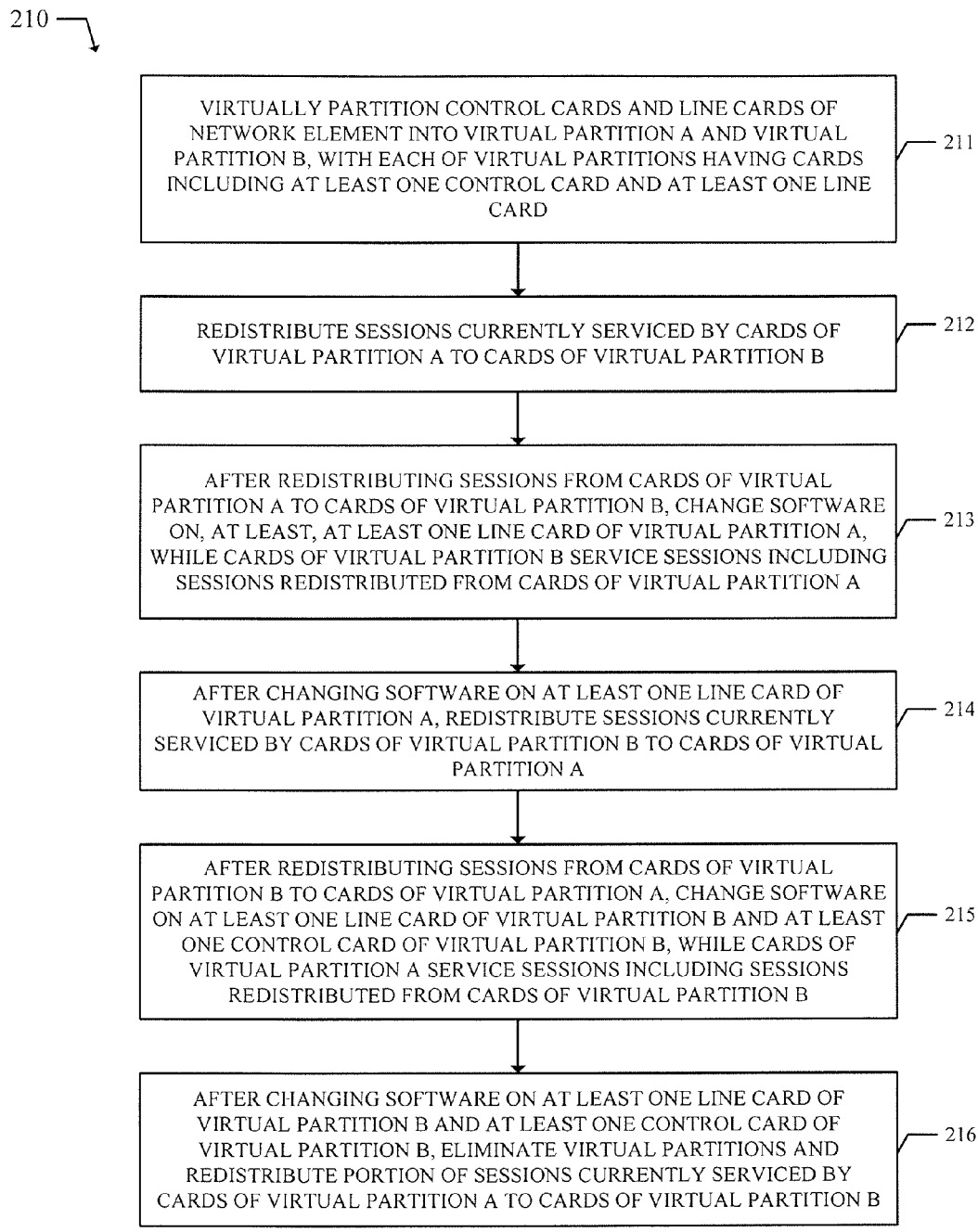
FIG. 2 is a block flow diagram illustrating an example embodiment of a method that may be performed within a network element, for changing software on both control and line cards of the network element, while the network element services sessions.

FIG. 2 is a block flow diagram illustrating an example embodiment of a method 210 that may be performed within a network element, for changing software on both control and line cards of the network element, while the network element services sessions. To better illustrate the operations, the operations of the block flow diagram will be described with reference to the example embodiments of FIGS. 3a-3f. However, it should be understood that the operations of the flow diagram can be performed by embodiments of the invention other than those discussed with reference to the example embodiments of FIGS. 3a-3f, and that the embodiments discussed with reference to the example embodiments of FIGS. 3a-3f can perform operations different than those discussed with reference to the block flow diagram of FIG. 2.

At block 211, a plurality of control cards and a plurality of line cards of the network element are virtually partitioned into a virtual partition A and a virtual partition B. Each of the virtual partitions have a plurality of cards, including at least one control card and at least one line card in each virtual partition. In one embodiment, each of the virtual partitions may have half or about half of the control cards and half or about half of the line cards, although this is not required. As previously mentioned, in one embodiment an ISSU command may specify the control and line cards in each virtual partition.

In one embodiment, the line cards of the network element may be virtually partitioned in such a way as to ensure external connection to interfaces is maintained with the line cards in each partition, which may help to avoid traffic loss. Commonly a network element has at least two different line cards that have access to the same external network in order to provide resiliency in the event that one of the line cards were to fail and to assist with load balancing. If one link to the network is lost, for example, if the link is cut or if one of the two line cards fails, the other link to the same network may survive as a backup link, which may help to avoid traffic loss. In one or more embodiments, this may be taken into consideration when virtually partitioning the line cards of the network element among the virtual partitions.

For example, in one embodiment, line cards of a network element may be virtually partitioned such that each virtual partition has line cards to provide access to the same set of external networks. For example, in one embodiment, the line cards may be virtually partitioned such that the line cards of a first virtual partition provide connections to all different external networks for which connections are provided by the line cards of the a second virtual partition, and the line cards of the second virtual partition provide connections to all different external networks for which connections are provided by the line cards of the first virtual partition. The connectivity resilience in the line cards may be virtually partitioned when the physical chassis is virtually partitioned. In this way, each of the virtual partitions will have access to the same external network. Advantageously, this may help to avoid traffic loss. This is not required, for example if traffic loss is tolerable, but is generally advantageous.

Figure 3A:
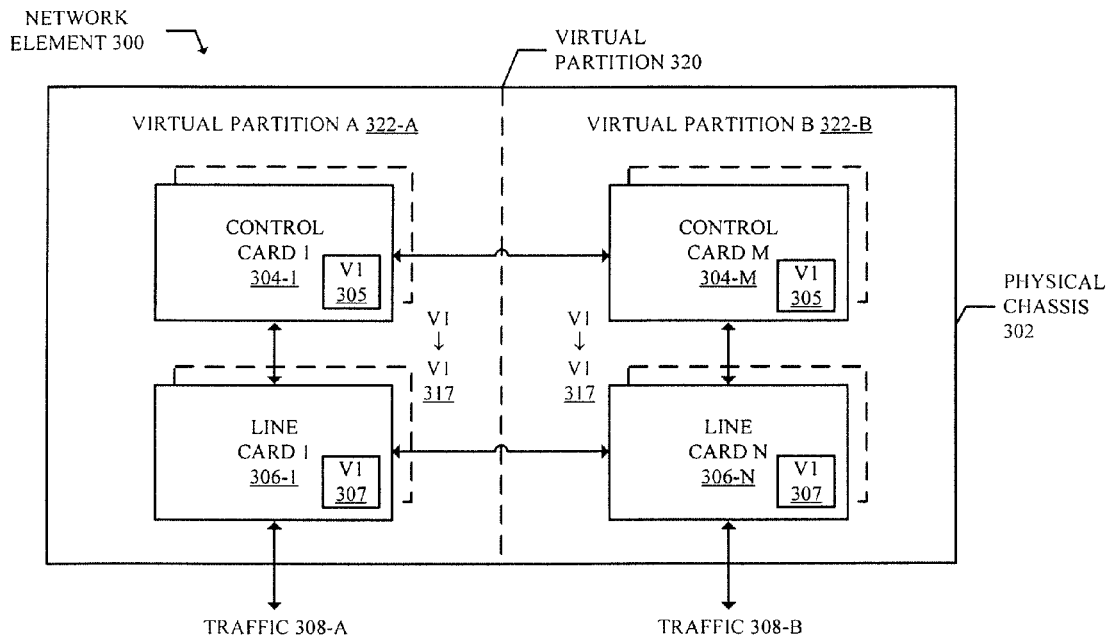
FIG. 3a is a block diagram illustrating an example embodiment of a network element having control cards and line cards that are virtually partitioned by a virtual partition.

FIG. 3a is a block diagram illustrating an example embodiment of a network element 300 having control cards 304 and line cards 306 of a single physical chassis 302 that are virtually partitioned by a virtual partition 320. A virtual partition A has at least control card 1 304-1 and optionally one or more other control cards, and line card 1 306-1 and optionally one or more other line cards. Likewise, a virtual partition B has at least control card M 304-M and optionally one or more other control cards, and line card N 306-N and optionally one or more other line cards.

At this stage of the ISSU, traffic 308 may be received at the line cards of each of the virtual partitions. For example, traffic 308-A may be received at the line card 1 of the virtual partition A, and traffic 308-B may be received at the line card N of the virtual partition B. Also, at this stage of the ISSU, all of the control cards are in communication with one another, all of the line cards are in communication with all of the control cards, and all of the line cards are in communication with one another. In this example, each of the control cards 304 have initial, for example version 1(V1), control card software 305 and each of the line cards have initial, for example version 1 (V1), line card software 307. Messages, data, or other communications between the cards are all initial-to-initial, for example V1-to-V1, communications. For example, as shown, communications between the control cards and the line cards may be V1-to-V1 communications 317.

Referring again to FIG. 2, sessions currently serviced by the cards of the virtual partition A are redistributed to the cards of the virtual partition B, at block 212. In one aspect, all of the sessions currently serviced by the cards of the virtual partition A may be redistributed to the cards of the virtual partition B. In one or more embodiments, this may be done by migrating or moving the sessions in a fashion of make-before-break so that there is no service impact on the control plane and the line cards continues forwarding traffic without interruption. The network element conventionally has capability to redistribute sessions, for example to perform load balancing. For example, this may be done with load index mapping (LIM) and load index redistribution.

Figure 3B:
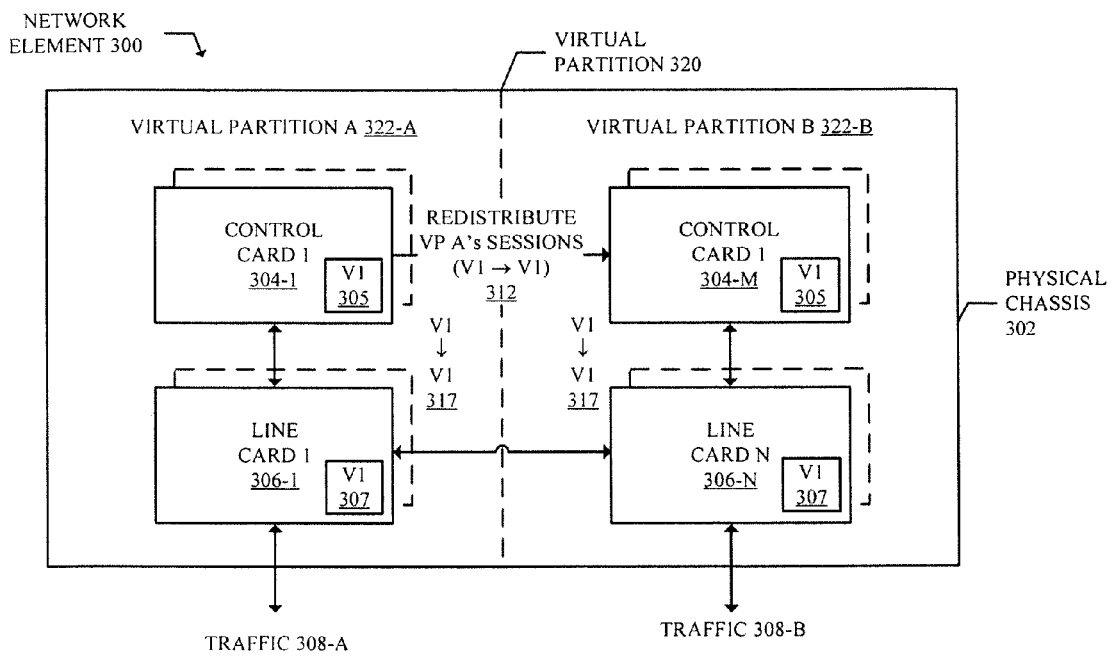
FIG. 3b is a block diagram illustrating the example embodiment of a network element showing redistribution of the sessions that are currently serviced by the cards of the virtual partition A, from the cards of the virtual partition A, to the cards of the virtual partition B.

FIG. 3b is a block diagram illustrating the example embodiment of the network element 300 showing redistribution of the sessions 312 that are currently serviced by the cards of the virtual partition A, from the cards of the virtual partition A, to the cards of the virtual partition B. Because the cards of both of the virtual partitions have initial, for example version 1 (V1), software, the sessions may be distributed with initial-to-initial, for example V1-to-V1, communications. The sessions redistributed from the cards of the virtual partition A may be redistributed not only to the at least one control card 304-M but also to the at least one line card 306-N of the virtual partition B. At this stage of the ISSU, traffic 308 may still be received at the line cards of each of the virtual partitions. Also, at this stage of the ISSU, all of the control cards are in communication with one another, all of the line cards are in communication with all of the control cards, and all of the line cards are in communication with one another. Note that such proactive redistribution of the sessions, which may occur prior to later taking the at least one line card of the virtual partition A offline, would not typically occur in the event of a card failure (where the card would typically not know of the failure in advance), or in the event of upgrading the software on a standby control card (where the sessions are already being handled by the active control card).

Referring again to FIG. 2, after redistributing the sessions from the cards of the virtual partition A to the cards of the virtual partition B, software is changed on, at least, the at least one line card of the virtual partition A, and in some embodiments on at least one control card of the virtual partition A, while the cards of the virtual partition B service sessions including the sessions redistributed from the cards of the virtual partition A, at block 213. Advantageously, by redistributing the sessions from the cards of the virtual partition A to the cards of the virtual partition B prior to changing the software on the card(s) of the virtual partition A, the network element is able to service the sessions, while the software is changed on the card(s) of the virtual partition A. This may help to minimize or at least reduce service interruption while the software is changed.

In one or more embodiments, in addition to the at least one line card, software may also optionally be changed on at least one control card of the virtual partition A at block 213. Such may be the case, for example, if the network element is configured to use a distributed control plane. Alternatively, as will be explained further below, the software may already have been changed on the at least one control card of the virtual partition A, for example if the at least one control card of the virtual partition A was a hot standby control card on which the software was previously upgraded. See e.g., the discussion associated with FIGS. 15-16.

Consider further an embodiment where, as in the example of FIG. 16, the network element is configured to use a distributed control plane. In the distributed control plane, the network element may include an active primary control card and a standby primary control card, and secondary control cards. During operation, the active primary control card may distribute control plane process instances to the secondary control cards. The secondary control cards may all run in active mode and receive, process, and send signaling messages for sessions. There generally are no true standby (non-active) secondary control cards. One advantage of the virtual partitioning based method of FIG. 2 is that the secondary control cards may be upgraded while the network element services sessions, even though there are no true standby (non-active) secondary control cards. In virtually partitioning the network element, at block 211, the distributed control plane may also be virtually partitioned. The at least one control card of the virtual partition A may include a primary control card and one or more secondary control cards, and the at least one control card of the virtual partition B may include a primary control card and one or more secondary control cards. In one embodiment, after the redistribution of the sessions at block 212, in addition to changing the software on the at least one line card of the virtual partition A, software may also be changed on the one or more secondary control cards of the virtual partition A, at block 213. In one embodiment, the primary control card of the virtual partition B, while servicing the sessions that were redistributed at block 212, may provide distributed control plane process instances to only the one or more secondary control cards within the virtual partition B, and not to any of the one or more secondary control cards within the virtual partition A.

Figure 3C:
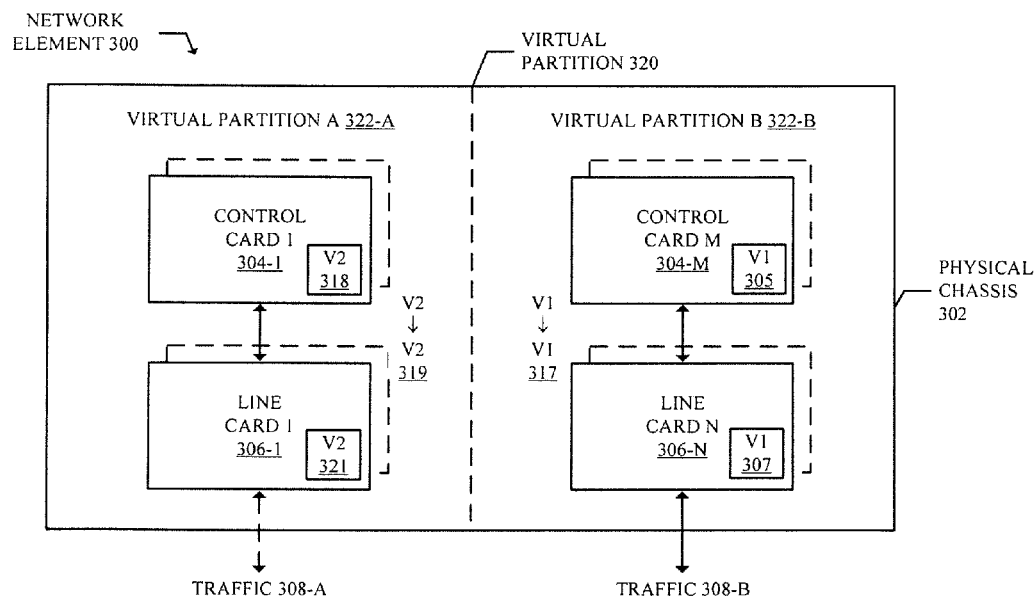
FIG. 3c is a block diagram illustrating the example embodiment of the network element after changing the software on cards of the virtual partition A.

FIG. 3c is a block diagram illustrating the example embodiment of the network element 300 after changing the software on cards of the virtual partition A. In this example embodiment, the initial (e.g., V1) line card software 307 on the at least one line card 1 306-1 has been changed to changed (e.g., version 2 or V2) line card software 321. Likewise, the initial (e.g., V1) control card software 305 on the at least one control card 1 304-1 has been changed to changed (e.g., V2) control card software 318. In one embodiment, changing the software on the at least one line card of the virtual partition A, and optionally on the at least one control card of the virtual partition A, may include changing at least one of field-programmable gate array (FPGA) software, application-specific integrated circuit (ASIC) software, kernel software, and microcode, and firmware. In one aspect, changing the software may include taking the cards out service and rebooting the cards on which the software is changed or upgraded. For example, the new software may be transferred over a network and written to non-volatile storage medium, such as flash memory, and then the cards may be booted up with the new software. In one or more embodiments, the changing the software may be accomplished without stalling user sessions or losing sessions or traffic.

As a result of changing the software, communications between the control and line cards in the virtual partition A may now be V2-to-V2 communications 319, whereas communications between the control and line cards in the virtual partition B may still be V1-to-V1 communications 317. Similarly, communications among the control cards of the virtual partition A, and among the line cards of the virtual partition A, may now be V2-to-V2 communications, whereas communications among the control cards of the virtual partition B, and among the line cards of the virtual partition B, may still be V1-to-V1 communications.

In one or more embodiments, the servicing of the sessions with the cards of the virtual partition B, after changing the software on the at least one line card of the virtual partition A, may include the at least one control card 304-M of the virtual partition B communicating with line cards only in the virtual partition B (e.g., the at least one line card N 306-N), and not with line cards in the virtual partition A (e.g. not with line card 1 306-1. For example, in one aspect, there may be two slot map tables, one for each of the virtual partitions. A first slot map table for the virtual partition A may have only the slots for cards in the virtual partition A, and a second slot map table for the virtual partition B may have only the slots for the cards in the virtual partition B.

It may be helpful to discuss the gradual virtual partitioning of the network element as shown in FIGS. 3a-3c. The changing of the software as shown in FIG. 3c may essentially complete the formation of the true virtually partitioning of the network element that was started in FIG. 3a. As mentioned, prior to the virtual partitioning, there is full mesh of communication among the control and line cards of the network element. Session distribution or load balancing may distribute sessions or balance loads among any control and line cards, for example according to their ability to handle the sessions. Sessions may be distributed to the control and line cards irrespective of what virtual partition they will later belong to.

Then, after the commencement of the virtually partitioning of the network element at FIG. 3a, during and prior to the completion of the redistribution of the sessions in FIG. 3b, traffic may still come into the virtual partition A, and communication between the control and line cards of the virtual partitions A and B may still take place. When traffic comes into the virtual partition A, the network element may understand that the proper destination of that traffic is in virtual partition B and no longer in virtual partition A. The network element may redistribute these sessions to the virtual partition B. Accordingly, the traffic may still come into partition A (as shown at traffic 308-A in FIG. 3b), but the partition A may determine that the traffic is to be redirected to the virtual partition B for the substantive processing, and forward the traffic to the virtual partition B. The substantive processing of the traffic may be handled in the virtual partition B. This is transitory while the redistribution of the sessions takes place from the virtual partition A to the virtual partition B. The line cards may still communicate with one another, including across the virtual partitions, while this redistribution of the sessions takes place. The formation of the true virtually partitioned network element may not have completed entirely at this point, but rather the network element may still be taking steps to prepare for the completion of the virtual partitioning.

Later, as shown in FIG. 3c, after the change of the software on the virtual partition A, in one embodiment, the true virtual partition may be completed and enforced by a slot map of the virtual partition that only has cards within that virtual partition. At this point, the line cards on the virtual partition A may not communicate directly with the line cards on the virtual partition B, to avoid translation complexity, but rather merely through the external network. Also, in one aspect, the control cards in one partition may not communicate with line cards in another partition, to avoid translation complexity. The control cards may, at appropriate times, still synchronize stateful data to other control cards.

Referring again to FIG. 3c, at this stage in the ISSU, traffic 308-A may either be received at the line card 1 306-1 of the virtual partition A, or the traffic 308-A may not be received at the line card 1 306-1 of the virtual partition A. For example, if an embodiment where the traffic is redirected away from the line card 1 of the virtual partition A, as will be discussed further below in conjunction with FIGS. 9-14 (and in particular with respect to blocks 1068 and 1071 of FIG. 10), then the traffic 308-A may not be received at the line card 1 of the virtual partition A. However, if no active redirecting of the traffic 308-A away from the line card 1 of the virtual partition A is performed, then the traffic may appear at the line card 1 of the virtual partition A. If the traffic 308-A is allowed to appear at the line card 1 of the virtual partition A (e.g., after rebooting the line card 1), then the traffic may appear at the line card 1 before there is session data available to handle the traffic 308-A. An advantage of the embodiment shown in FIG. 10 below (e.g., at block 1071) is that traffic may not appear at the line card until after session data to handle the traffic is present.

Figure 3D:
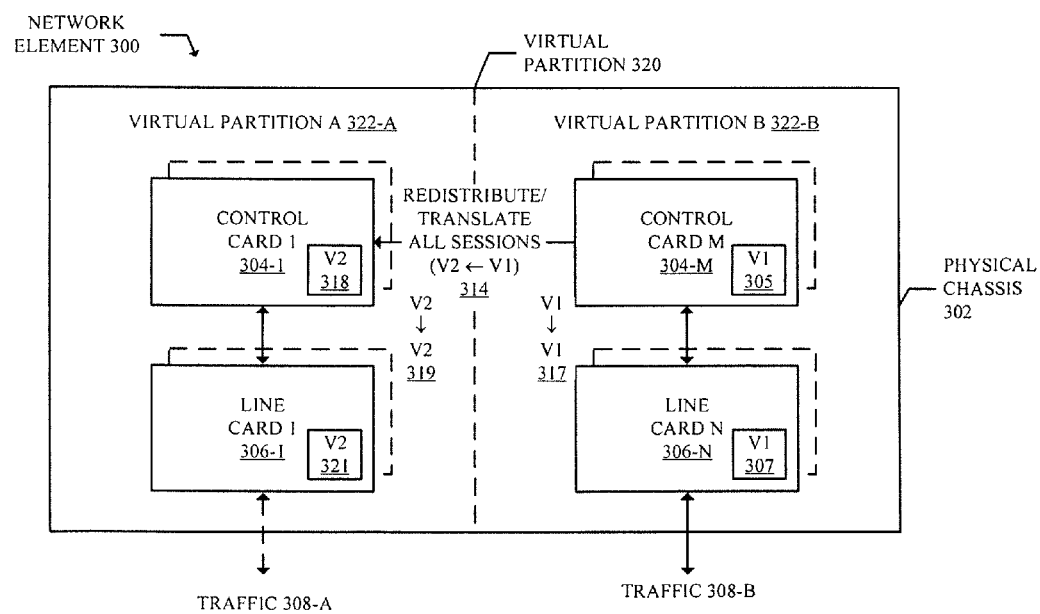
FIG. 3d is a block diagram illustrating the example embodiment of the network element showing redistribution of all sessions currently serviced by the cards of the virtual partition B, from the cards of the virtual partition B, to the cards of the virtual partition A.

Referring again to FIG. 2, after changing the software on, at least, the at least one line card of the virtual partition A, sessions currently serviced by the cards of the virtual partition B are redistributed to the cards of the virtual partition A, at block 214. In one aspect, all of the sessions currently serviced by the cards of the virtual partition B, which in this example is all of the sessions currently serviced by the network element, may be redistributed to the cards of the virtual partition A. In one or more embodiments, this may be done by migrating or moving the sessions in a fashion of make-before-break so that there is no service impact on the control plane and the line cards continues forwarding traffic without interruption. For example, this may be done load index mapping (LIM) and load index redistribution, as previously mentioned FIG. 3d is a block diagram illustrating the example embodiment of the network element 300 showing redistribution and translation of all sessions 314 currently serviced by the cards of the virtual partition B, from the cards of the virtual partition B, to the cards of the virtual partition A. Because the at least one control card M 304-M of the virtual partition B has the initial (for example V1) or not-yet-changed control card software 305, whereas the at least one control card 1 304-1 of the virtual partition A has the already-changed (for example V2) control card software 318, the sessions may be redistributed with initial-to-changed (for example V1-to-V2) communications 314 between the control card M 304-M and the control card 1 304-1. In one embodiment, this may include translating the sessions that are being redistributed from the not-yet-changed control card software 305 to the already-changed control card software 318. For example, the translation may potentially need to account for differences between the prior and changed software in the expected format and semantic content of state. The state may include, for example, traffic forwarding tables, user session information, configuration data, firewall information, quality of service information, statistics, or other stateful or run-time data.

The translated sessions may then be provided from the at least one control card 1 304-1 of the virtual partition A to the at least one line card 1 306-1 of the partition A. The translation may be strictly between control cards, while the line cards may receive the sessions downloaded from the control cards on the same virtual partition. Since the control card software 318 on the control card 1 304-1 and the line card software 321 on the line card 1 306-1 have both already been changed, translation is not needed between the control card 1 304-1 and the line card 1 306-1. Rather, these may be changed-to-changed (for example V2-to-V2) communications 319. The control cards on the virtual partition A are not required to communicate with the line cards on the virtual partition B. This may help to avoid significant translation complexity by avoiding translating the sessions from the not-yet-changed control card software 305 of the at least one control card M 304-M of the partition B to the already-changed line card software 321 of the at least one line card 1 306-1 of the partition A.

In one aspect, it is still possible to roll back at this point of the ISSU, if desired. Since the virtual partition B has handled all of the sessions for the whole network element, the virtual partition A can abort the software upgrade or roll back to the old software if desired.

Referring again to FIG. 2, after redistributing the sessions from the cards of the virtual partition B to the cards of the virtual partition A, software on the at least one line card of the virtual partition B is changed and software on the at least one control card of the virtual partition B is changed, while the cards of the virtual partition A service sessions including the sessions redistributed from the cards of the virtual partition B, at block 215. In one aspect, the cards on the virtual partition A may service all of the sessions handled by the network element. Advantageously, by redistributing the sessions from the cards of the virtual partition B to the cards of the virtual partition A prior to changing the software on the card(s) of the virtual partition B, the network element is able to service the sessions, while the software is changed on the card(s) of the virtual partition B. This may help to minimize or at least reduce service interruption while the software is changed.

Figure 3E:
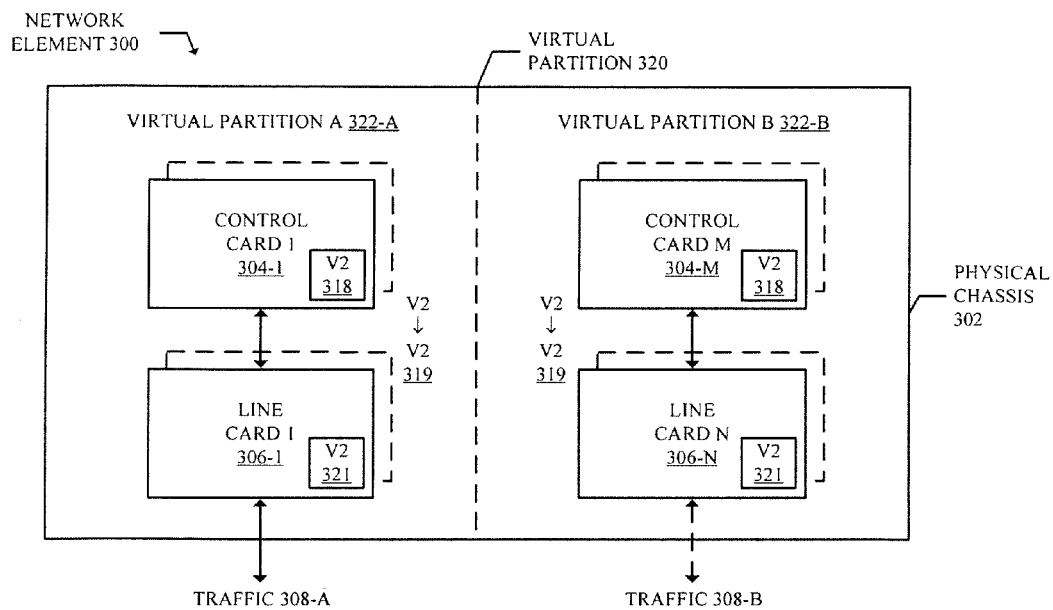
FIG. 3e is a block diagram illustrating the example embodiment of the network element after changing the software on cards of the virtual partition B.

FIG. 3e is a block diagram illustrating the example embodiment of the network element 300 after changing the software on cards of the virtual partition B. In this example embodiment, the initial (e.g., V1) line card software 307 on the at least one line card N 306-N has been changed to changed (e.g., V2) line card software 321. Likewise, the initial (e.g., V1) control card software 305 on the at least one control card M 304-M has been changed to changed (e.g., V2) control card software 318 on the at least one control card M 304-M. In one embodiment, changing the software on the at least one line card N 306-N and/or on the at least one control card M 304-M may include changing at least one of field-programmable gate array (FPGA) software, application-specific integrated circuit (ASIC) software, kernel software, and microcode, and firmware. In one aspect, changing the software may include rebooting the cards on which the software is changed or upgraded. As a result of changing the software, communications between the control and line cards in the virtual partition B may now be V2-to-V2 communications 319. Similarly, communications among the control cards of the virtual partition B, and among the line cards of the virtual partition B, may now be V2-to-V2 communications.

At this stage in the ISSU, traffic 308B may either be received at the line card N 306-N of the virtual partition B, or the traffic 308B may not be received at the line card N 306-N of the virtual partition B. For example, if an embodiment where the traffic is redirected away from the line card N of the virtual partition B, as will be discussed further below in conjunction with FIGS. 9-14 (and in particular with respect to blocks 1174 and 1177 of FIG. 11), then the traffic 308B may not be received at the line card N of the virtual partition B. However, if no active redirecting of the traffic 308B away from the at the line card N of the virtual partition B is performed, then the traffic may appear at the line card N of the virtual partition B. One potential drawback to allowing the traffic 308B to appear at the line card N of the virtual partition B (e.g., after rebooting the line card N) is that the traffic may appear at the line card N before there is session data available to handle the traffic 308B. An advantage of the embodiment shown in FIG. 11 below (e.g., at block 1177) is that traffic may not appear at the line card until after session data to handle the traffic is present.

Referring again to FIG. 2, after changing the software on the at least one line card of the virtual partition B, and the at least one control card of the virtual partition B, the virtual partitions are eliminated and a portion of the sessions currently serviced by the cards of the virtual partition A are redistributed to the cards of the virtual partition B, at block 216. In one aspect, the portion of the sessions that are redistributed may be redistributed based on load balancing or load redistribution objectives. In one aspect, approximately half of the sessions serviced by the cards of the virtual partition A may be redistributed to the cards of the virtual partition B, although the scope of the invention is not so limited.

Figure 3F:
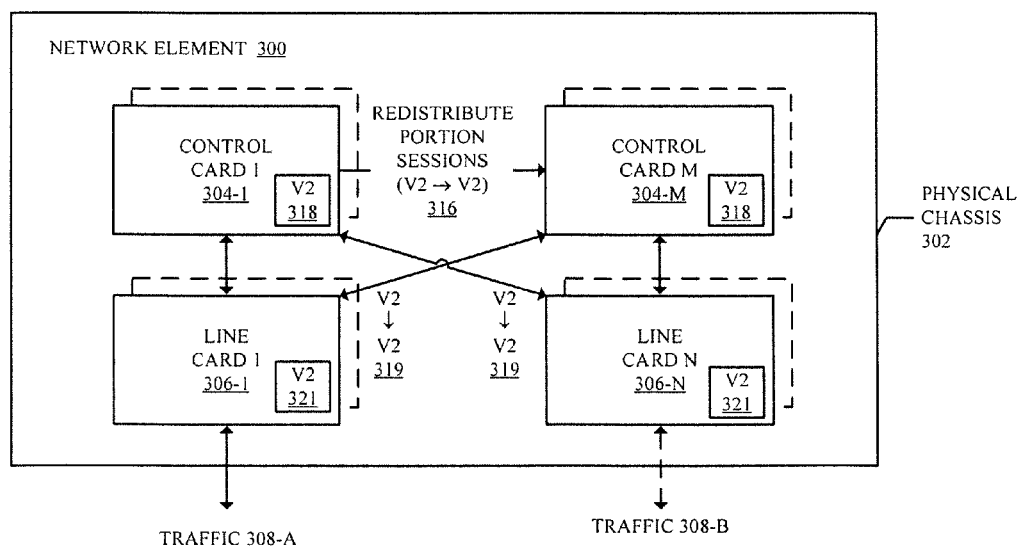
FIG. 3f is a block diagram illustrating the example embodiment of the network element showing redistribution of a portion of sessions serviced by the at least one control card of the virtual partition A to the at least one control card of the virtual partition B and elimination of the virtual partition.

FIG. 3f is a block diagram illustrating the example embodiment of the network element 300 showing redistribution of a portion of sessions 316 serviced by the at least one control card 1 304-1 to the at least one control card M 304-M and elimination of the virtual partition 320. Because the at least one control card M 304-M has the changed (for example V2) control card software 318, and the at least one control card 1 304-1 has the changed (for example V2) control card software 318, the sessions may be redistributed with changed-to-changed, for example V2-to-V2, communications 316. At this completion stage of the ISSU, traffic 308 may be received at the at least one line card 1 306-1 and at the at least one line card N 306-N. For example, traffic 308-A may be received at the line card 1, and traffic 308-B may be received at the line card N. Also, at this completion stage of the ISSU, all of the control cards are in communication with one another, and all of the line cards are in communication with all of the control cards, and all of the line cards are in communication with one another, as before the virtual partitioning began.

Advantageously, the method of FIG. 2 allows for software to be changed on both the control and line cards of the network element, while the network element services sessions. This allows for service interruption due to the changing of the software to be prevented, minimized, or at least reduced.

Figure 4:
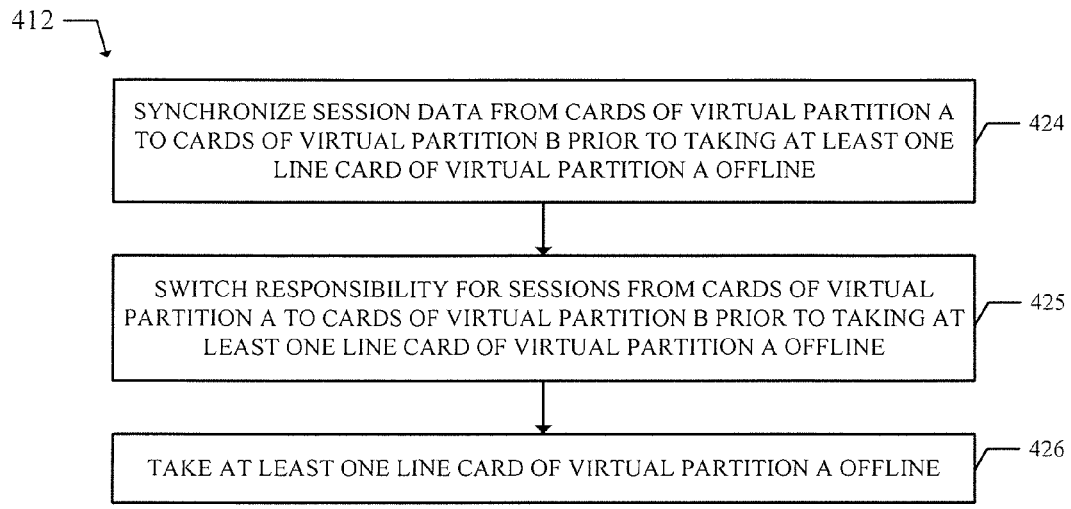
FIG. 4 is a block flow diagram illustrating an example embodiment of a method for redistributing sessions from cards of a virtual partition A (a first virtual partition to be upgraded) to cards of a virtual partition B.

FIG. 4 is a block flow diagram illustrating an example embodiment of a method 412 for redistributing sessions currently serviced by cards of a virtual partition A (a first virtual partition to be upgraded), from the cards of the virtual partition A to cards of a virtual partition B, before changing software on, at least, at least one line card of the virtual partition A. The method 412 represents one example embodiment of a set of operations suitable for the block 212 of FIG. 2.

At block 424, session data is synchronized, from the cards of the virtual partition A, to the cards of the virtual partition B, prior to taking the at least one line card of the virtual partition A offline. Synchronizing the session data may include moving or copying the session data. Then, responsibility for the sessions is switched, from the cards of the virtual partition A, to the cards of the virtual partition B, prior to taking the at least one line card of the virtual partition A offline, at block 425. One example way of switching the responsibility for the sessions is to sending a load index mapping (LIM) table to each control card and each line card reflecting a switchover in the responsibility for the sessions. Then, the at least one line card of the virtual partition A is taken offline, at block 426.

Figure 5:
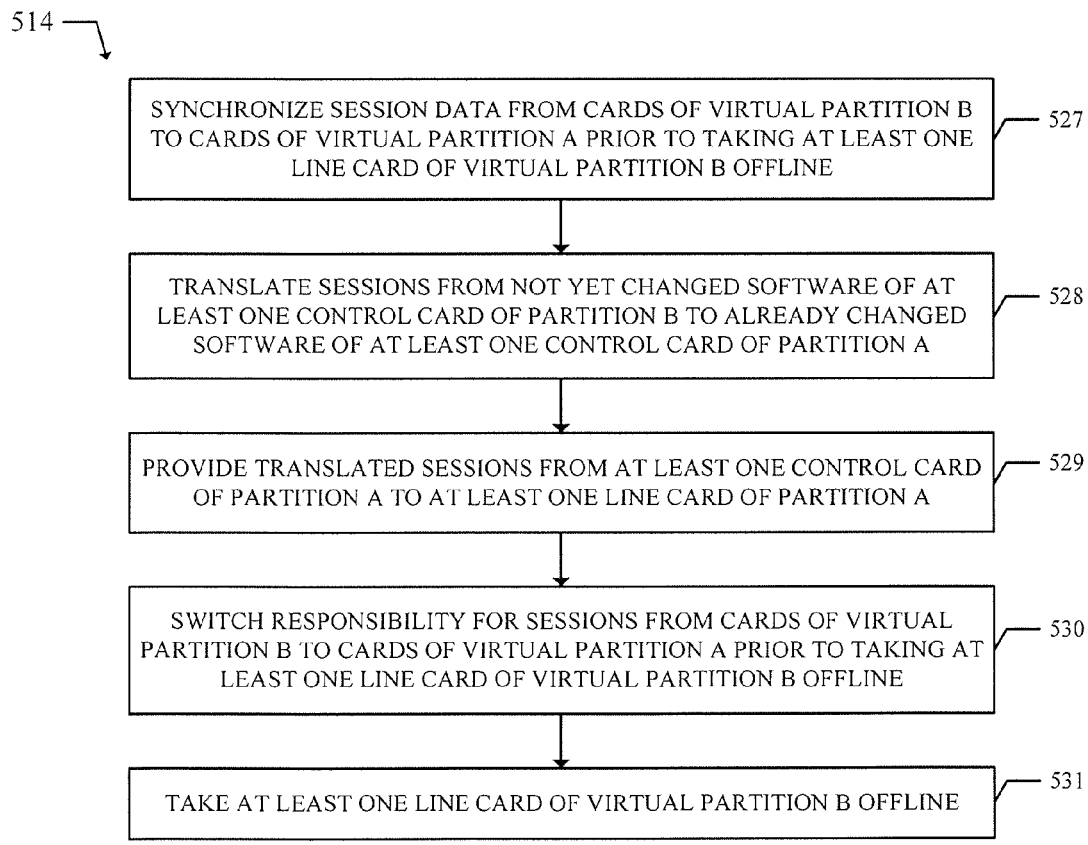
FIG. 5 is a block flow diagram illustrating an example embodiment of a method for redistributing sessions from cards of a virtual partition B (a subsequent virtual partition to be upgraded) to cards of a virtual partition A.

FIG. 5 is a block flow diagram illustrating an example embodiment of a method 514 for redistributing sessions currently serviced by cards of a virtual partition B (a subsequent virtual partition to be upgraded) to cards of a virtual partition A, which is performed after changing the software on at least one line card of the virtual partition A and before changing the software on control and line cards of the virtual partition B. The method 514 represents one example embodiment of a set of operations suitable for the block 214 of FIG. 2.

At block 527, session data is synchronized, from the cards of the virtual partition B, to the cards of the virtual partition A, prior to taking at least one line card of the virtual partition B offline. Synchronizing the session data may include moving or copying the session data. Sessions are translated, from the not-yet-changed software of at least one control card of the partition B, to the already-changed software of the at least one control card of the partition A, at block 528. Then, the translated sessions are provisioned or otherwise provided from the at least one control card of the partition A to the at least one line card of the partition A, at block 529. As previously mentioned, this allows translation complexity to be avoided by avoiding translating sessions from the not-yet-changed control card software of the at least one control card of the partition B to the already-changed line card software of the at least one line card of the partition A. Responsibility for the sessions is switched, from the cards of the virtual partition B, to the cards of the virtual partition A, prior to taking the at least one line card of the virtual partition B offline, at block 530. One example way of switching the responsibility for the sessions is to sending a load index mapping (LIM) table to each control card and each line card reflecting a switchover in the responsibility for the sessions. Then, the at least one line card of the virtual partition B is taken offline, at block 531.

Figure 6:
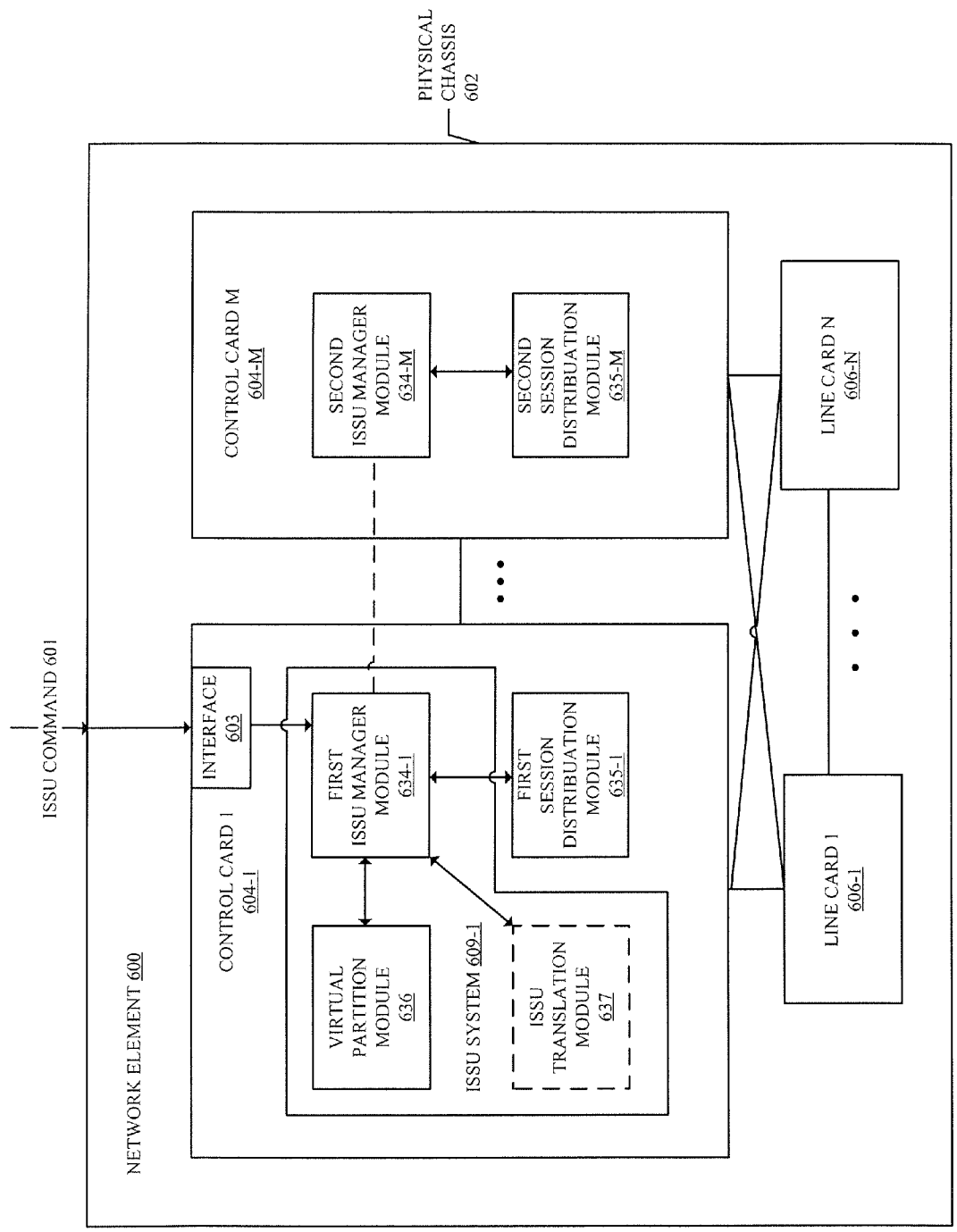
FIG. 6 is a block diagram illustrating an example embodiment of a configuration of internal modules for a network element, that is operable to upgrade software on both control and line cards thereof, while the network element services sessions.

FIG. 6 is a block diagram illustrating an example embodiment of a configuration of internal modules for a network element 600, that is operable to upgrade software on both control and line cards thereof, while the network element services sessions. The network element includes at least a control card 1 604-1 and a control card M 604-M, and optionally one or more other control cards. The control cards are coupled together. The network element also includes at least a line card 1 606-1 and a line card N 606-N, and optionally one or more other line cards. The line cards are coupled with the control cards, and the line cards are coupled together. The control cards and the line cards of the network element may belong to, or be coupled with, a single physical chassis 602.

In the illustrated embodiment, the control card 1 604-1 has an interface 603, such as a command line interface, to receive an ISSU command 601, although as previous mentioned other interfaces are also contemplated. The control card 1 604-1 has a set of modules representing an ISSU system 609-1. The ISSU system of the control card 1 includes a first ISSU manager module (ISSU-MM) 634-1, a virtual partition creation/elimination module (VPM) 636, a first session distribution module (SDM) 635-1, and an ISSU translation module 637. The ISSU command may be provided to the first ISSU-MM 634-1. The first ISSU-MM 634-1 may manage or oversee the ISSU on the network element, or at least on the control card 1 604-1, responsive to receiving the command. The first ISSU-MM 634-1 is coupled with, or in communication with, the VPM 636, the first SDM 635-1, and the ISSU translation module 637, and may provide messages, such as control or management messages or instructions, to these other modules. The control card M 604-M has a second ISSU-MM 634-M and a second SDM 635-M. In one or more embodiments, the first ISSU-MM 634-1 and the second ISSU-MM 634-M may optionally be coupled or in communication with one another, for example to coordinate operations during the ISSU. Alternatively, the first and second ISSU-MM may communicate through other components (e.g., through control card service layers).

The first and second SDM 635 may represent conventional or substantially conventional modules in the network element. The SDM 635 are commonly employed in the network element even without the ISSU attributes described herein to assist with session distribution, controlling synchronization (e.g., which cards synchronize to which other cards), and load balancing functions. One particular suitable example embodiment of the SDM 635 is a load index mapping (LIM) manager module as known in the arts, or other modules that perform similar functions of session distribution or redistribution. Session distribution modules in different virtual partitions may optionally be capable of communicating with one another, or they may communicate via other components e.g., a service layer.

To further illustrate how the modules of the network element may potentially operate, an example embodiment will be described with respect to operations similar to those of the flow diagram of FIG. 2. However, it should be understood that the network element of FIG. 6 can performed operations and methods entirely different than those discussed with reference to the flow diagrams. Moreover, the operations and methods of the flow diagrams can be performed by embodiments entirely different than the network element of FIG. 6.

After the first ISSU-MM 634-1 receives or is made aware of the receipt of the ISSU command 601, the VPM 636, when instructed by the first ISSU-MM 634-1, may virtually partition the control cards and the line cards of the network element into a virtual partition A and a virtual partition B. As mentioned, the ISSU command may optionally specify the cards in each virtual partition. In the illustrated example, the virtual partition A may have at least the control card 1 604-1 and at least the line card 1 606-1, and the virtual partition B may have at least the control card M 604-M and at least the line card N 606-N.

The first SDM 635-1 may be operable, when instructed by the first ISSU-MM 634-1, to redistribute sessions currently serviced by the cards of the virtual partition A to the cards of the virtual partition B. Then, the first ISSU-MM 634-1 may be operable, after the first SDM 635-1 redistributes the sessions, to initiate an ISSU of software on, at least, the line card 1 606-1 of the virtual partition A, and in some cases on at least one control card of the virtual partition A (e.g., on a feature card), while the cards of the virtual partition B service sessions including the sessions redistributed from the cards of the virtual partition A.

The second SDM 634-M may be operable, after the ISSU on the at least one line card of the virtual partition A, and when instructed by the second ISSU-MM 634-M, to redistribute sessions currently serviced by the cards of the virtual partition B to the cards of the virtual partition A. Then, the second ISSU-MM 634-M may be operable, after the second SDM 635-M redistributes the sessions, to initiate an ISSU of software on the control card M 604-M and the line card N 606-N of the virtual partition B, while the cards of the virtual partition A service sessions including the sessions redistributed from the cards of the virtual partition B.

The VPM 636 may be operable, after the ISSU on the control card M 604-M and the line card N 606-N of the virtual partition B, and when instructed by the first ISSU-MM 634-1, to eliminate the virtually partitions. The first SDM 635-1 may be operable, when instructed by the first ISSU-MM 634-1, to redistribute a portion of the sessions currently serviced by the control card 1 604-1 to the control card M 604-M.

Figure 7:
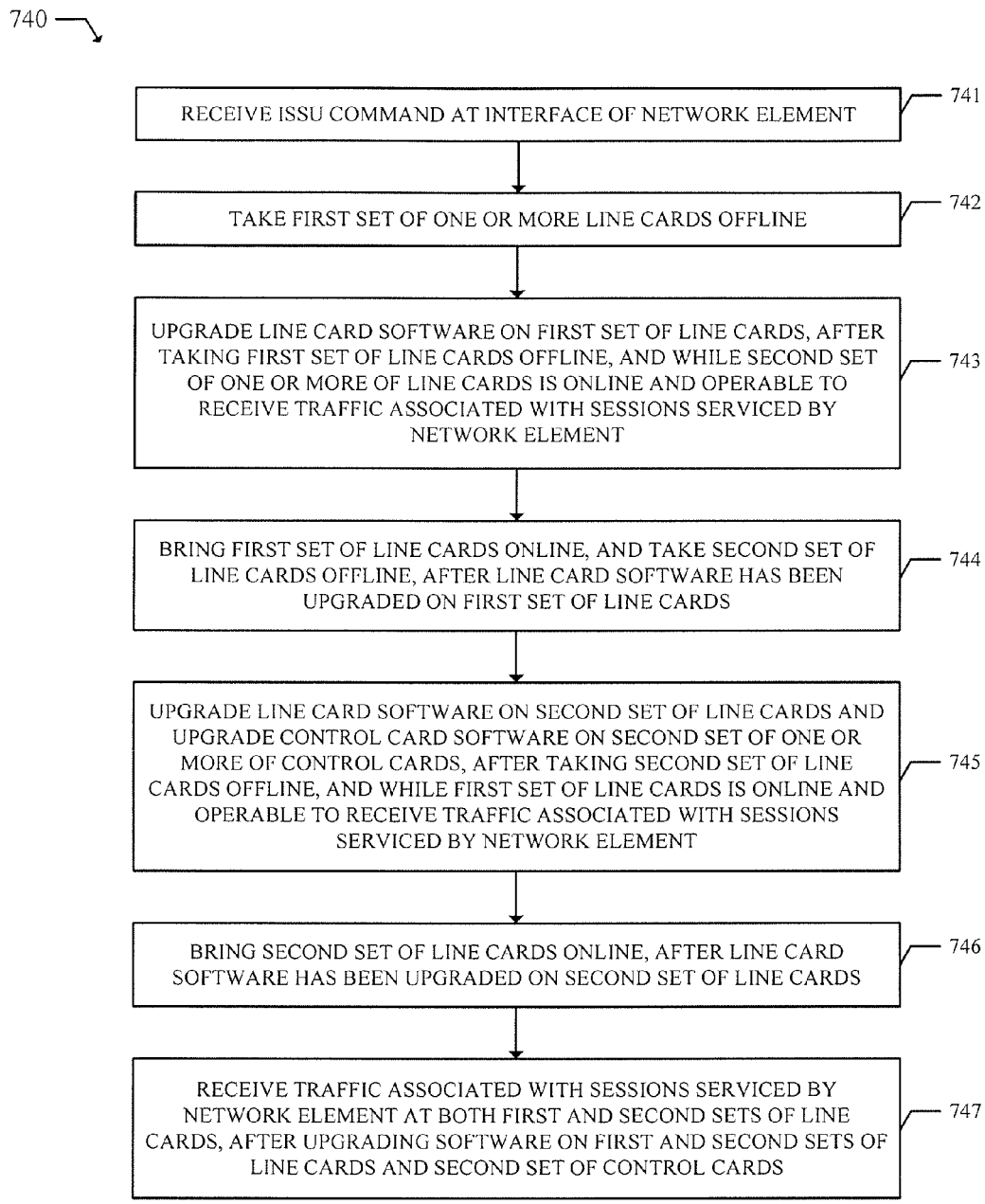
FIG. 7 is a block flow diagram illustrating another example embodiment of a method that may be performed by a network element, from a perspective taken outside of the network element, to upgrade software on both control and line cards of the network element, while the network element services sessions.

FIG. 7 is a block flow diagram illustrating another example embodiment of a method 740 that may be performed by a network element, from a perspective taken outside of the network element, to upgrade software on both control and line cards of the network element, while the network element services sessions. Since the software is upgraded on the cards of the network element while the network element services sessions, service interruption due to the upgrading of the software avoided.

At block 741, an ISSU command may be received at an interface of the network element. The ISSU command may be received as described elsewhere herein. The network element may perform the remaining operations of the method in response to, or as a result of, the receipt of the ISSU command.

A first set of one or more line cards may be taken offline, at block 742. In one aspect, half or about half of the line cards may be taken offline. In some embodiments, a first set of one or more control cards may also be taken offline.

Then, line card software may be upgraded on the first set of the line cards, after taking the first set of the line cards offline, and while a second set of one or more of the line cards is online and operable to receive traffic associated with the sessions serviced by the network element, at block 743. In some embodiments, control card software on the first set of one or more control cards may also be upgraded. In one aspect, the software may have been previously transmitted over a network to the network element. If desired, a network administrator or other practitioner may optionally be able to confirm that the line card software has been upgraded on the first set of the line cards, for example, by issuing a command through a command line interface (CLI) or other management interface to query for attributes of the line card software, although the scope of the invention is not limited in this respect.

Next, the first set of the line cards may be brought back online, and the second set of the line cards may be taken offline, after the line card software has been upgraded on the first set of the line cards, at block 744. In some embodiments, a second set of one or more control cards may also be taken offline.

Then, line card software may be upgraded on the second set of the line cards and control card software may be upgraded on the second set of one or more control cards, after taking the second set of the line cards offline, and while the first set of the line cards is online and operable to receive traffic associated with the sessions serviced by the network element, at block 745. As before, if desired, a network administrator or other practitioner may optionally be able to confirm that the line card software has been upgraded on the first set of the line cards, for example, by issuing a command through a command line interface (CLI) or other management interface to query for attributes of the line card software, although the scope of the invention is not limited in this respect.

Then, the second set of the line cards may be brought back online, after the line card software has been upgraded on the second set of the line cards, at block 746. In some embodiments, the second set of the one or more control cards may also be brought back offline. Traffic associated with the sessions serviced by the network element may be received at both the first and second sets of the line cards, after upgrading the software on the first and second sets of the line cards and the second set of the control cards, at block 747.

Figure 8:
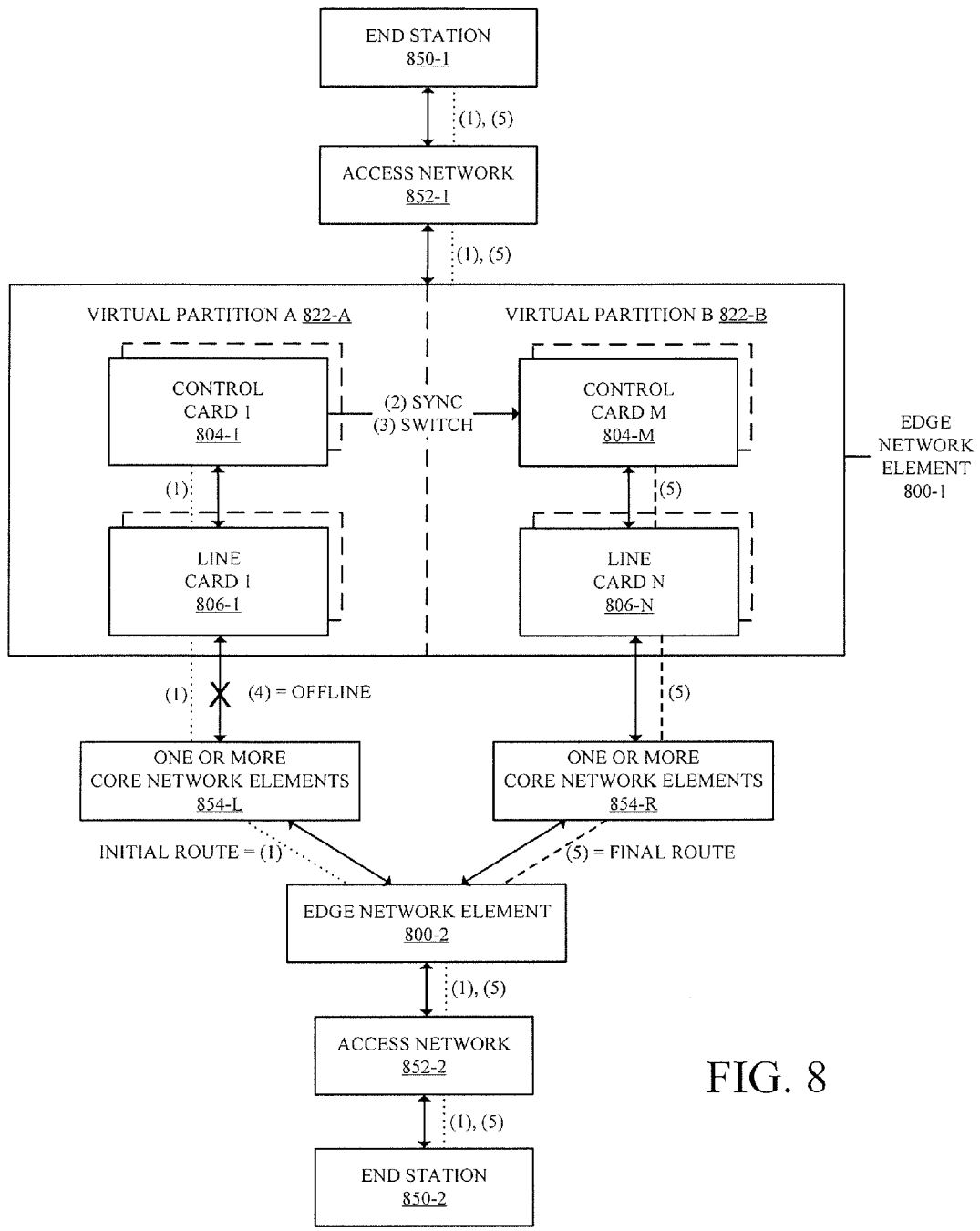
FIG. 8 is a block diagram illustrating an example embodiment of a network having an edge network element on which an ISSU may be performed, and illustrating a first approach by which traffic may be re-routed from cards of a virtual partition A to cards of a virtual partition B.

FIG. 8 is a block diagram illustrating an example embodiment of a network having an edge network element 800-1 on which an ISSU may be performed, and illustrating a first approach by which traffic may be re-routed from cards 804-1, 806-1 of a virtual partition A 822-A to cards 804-M, 806-N of a virtual partition B 822-B. While in this example embodiment the ISSU is performed on the edge network element, in another embodiment the ISSU may be performed on a core network element.

The network includes a first end station 850-1, a first access network 852-1, the aforementioned first edge network element 800-1, a first set of one or more core network elements 854-L, a second set of one or more core network elements 854-R, a second edge network element 800-2, a second access network 852-2, and a second end station 850-2. By way of example, the first and second end stations may be subscriber end stations or server end stations.

Subscriber or computer end stations (e.g., servers, workstations, laptops, netbooks, palm tops, mobile phones, smartphones, multimedia phones, Voice Over Internet Protocol (VoIP) phones, user equipment, terminals, portable media players, Global Positioning System (GPS) units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

In the illustration, reference numbers (1) through (5) are used to show a particular sequence of events, according to the first approach by which traffic is re-routed during an embodiment of an ISSU method. Initially, as shown by the dotted lines and the reference numbers (1), the first and second end stations 850 may be coupled through the first and second access networks 852, the first and second edge network elements 800, and the first set of one or more core network elements 854-L (on the left). Subsequently, performing the ISSU on the first edge network element 800-1 may include redistributing sessions currently serviced by the cards of the virtual partition A to the cards of the virtual partition B. As previously mentioned, for example, in connection with FIG. 4, the redistributing of the sessions may involve first synchronizing the session data, as shown by the reference number (2), and then switching responsibility for the sessions, as shown by the reference number (3). As further previously mentioned, for example, in connection with FIG. 4, the at least one line card 1 806-1 of the virtual partition A may be taken offline, as shown by the reference number (4). For example, the at least one line card 1 806-1 of the virtual partition A may be rebooted or otherwise taken offline when the software is upgraded or changed on the at least one line card 1 806-1. The network is conventionally able to detect that the at least one line card 1 806-1 has been taken offline. The network is also conventionally able to determine an alternate route to maintain the communication between the first and second end stations 850. For example, as shown by the dashed lines and the reference numbers (5), the network may determine a new route through the second set of one or more core network elements 854-R (on the right) and through the at least one line card N 806-N and control card M 804-M of the virtual partition B 822-B.

Although the network has conventional abilities to determine the alternate route to maintain the communication between the first and second end stations 850, there are certain disadvantages to relying on these conventional re-rerouting capabilities. For one thing, it tends to take time for the network to detect that the at least one line card 1 806-1 has been taken offline and to determine the alternate route to maintain the communication between the first and second end stations 850. For some embodiments (e.g., cell phone communications), this amount of time, even if relatively small, may be undesirable. Another disadvantage, of relying on these conventional re-rerouting capabilities, is that when the at least one line card 1 806-1 comes back online, for example after being rebooted during the upgrading of the software on the at least one line card 1 806-1, traffic may begin to come into the at least one line card 806-1 before the cards of the virtual partition A 822-A have session data to handle the traffic.

Figure 9:
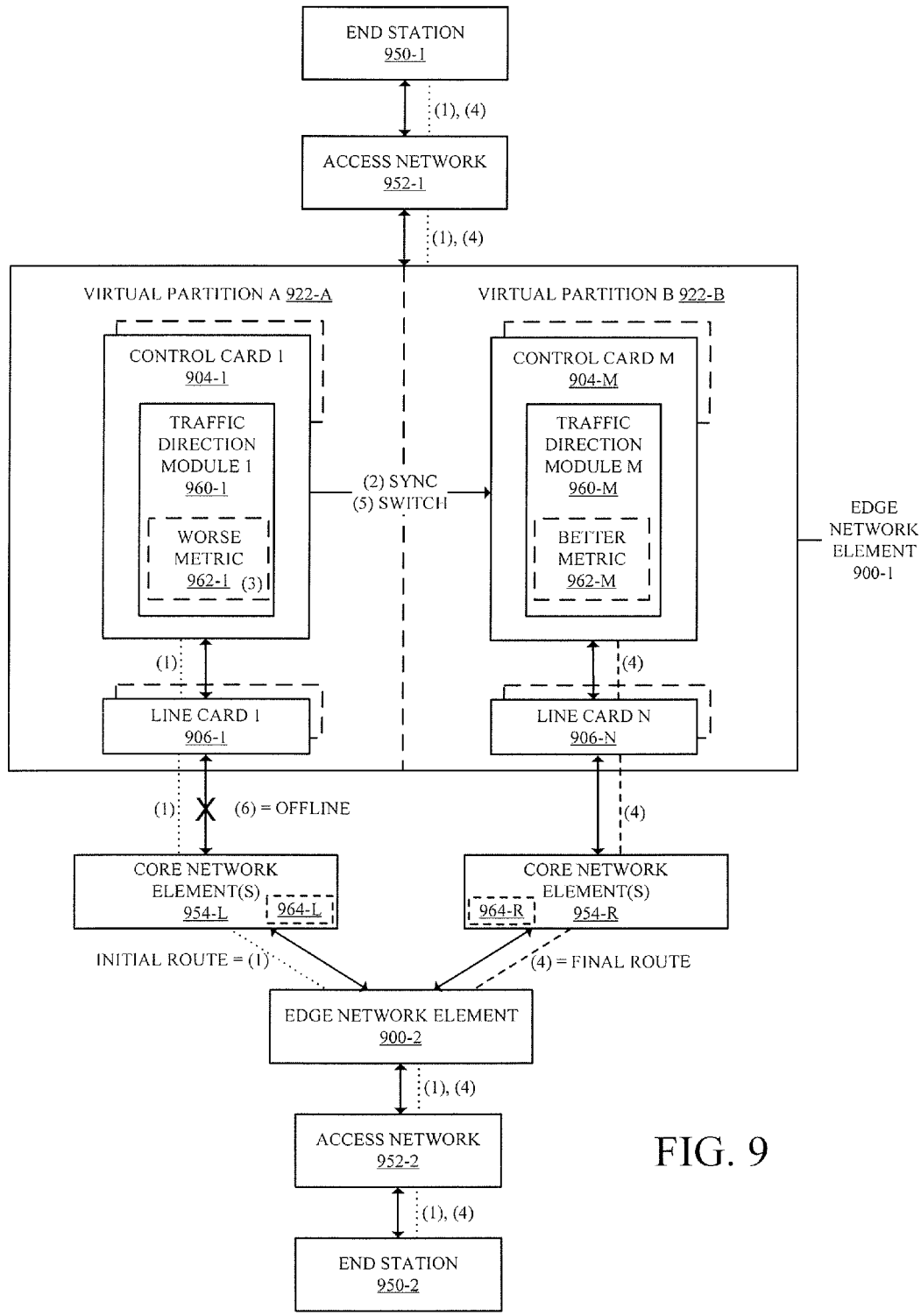
FIG. 9 is a block diagram illustrating an example embodiment of a network having an edge network element on which an ISSU may be performed, and illustrating a second approach by which traffic may be re-routed from cards of a virtual partition A to cards of a virtual partition B.

FIG. 9 is a block diagram illustrating an example embodiment of a network having an edge network element 900-1 on which an ISSU may be performed, and illustrating a second approach by which traffic may be re-routed from cards 904-1, 906-1 of a virtual partition A 922-A to cards 904-M, 906-N of a virtual partition B 922-B. While in this example embodiment the ISSU is performed on the edge network element, in another embodiment the ISSU may be performed on a core network element.

Similar to FIG. 8, the network includes a first end station 950-1, a first access network 952-1, the aforementioned first edge network element 900-1, a first set of one or more core network elements 954-L, a second set of one or more core network elements 954-R, a second edge network element 900-2, a second access network 952-2, and a second end station 950-2. Except for the additional or different features mentioned below, and in particular except for the traffic direction capabilities of the first edge network element 900-1, these components may be the same as the correspondingly named and numbered components of FIG. 8.

The control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic. Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

In the illustrated embodiment of the first edge network element 900-1, the control card 1 904-1 has a traffic direction module 1 960-1 and the control card M 904-M has a traffic direction module M 960-M. Each of the traffic direction modules is operable to direct, divert, or influence traffic on the line cards on the corresponding virtual partition. For example, the traffic direction module 1 960-1 is operable to either direct traffic to come into the at least one line card 1 906-1, or direct traffic away from the at least one line card 1 906-1. Similarly, the traffic direction module M 960-M is operable to either direct traffic to come into the at least one line card N 906-N, or direct traffic away from the at least one line card N 906-N. A traffic direction module, of one embodiment, is operable to influence a routing protocol decision, for example, by changing one or more routing protocol metrics. A traffic direction module, of another embodiment, is operable to actively withdraw an network address, for example, by sending a message to the network that the network address is being withdrawn. The traffic direction module of one embodiment is a routing protocol module.

In the illustration, reference numbers (1) through (5) are used to show a particular sequence of events, according to the second approach by which traffic is re-routed during an embodiment of an ISSU method. Initially, as shown by the dotted lines and the reference numbers (1), the first and second end stations 950 may be coupled through the first and second access networks 952, the first and second edge network elements 900, and the first set of one or more core network elements 954-L (on the left). Subsequently, performing the ISSU on the first edge network element 900-1 may include redistributing sessions currently serviced by the cards of the virtual partition A to the cards of the virtual partition B. The redistributing of the sessions may involve synchronizing the session data, as shown by the reference number (2). Then, in the illustrated embodiment, the traffic direction module 1 960-1 may direct traffic away from the line card 1 906-1 by announcing or otherwise providing a worse metric 962-1, as shown by the reference number (3), which is worse than a better metric 962-M of the traffic direction module M 960-M. The terms worse and better are relative to one another. Then, as a result of the worse metric 962-1, as shown by the dashed lines and the reference numbers (4), the network may determine a new route through the second set of one or more core network elements 954-R (on the right) and through the at least one line card N 906-N and control card M 904-M of the virtual partition B 922-B. For example, the first set of one or more core network elements 954-L may have a first routing protocol module 964-L, and the second set of one or more core network elements 954-R may have a second routing protocol module 964-R, to detect the new route. Responsibility for the sessions may be switched from the control card 1 to the control card M, as shown by the reference number (5). The responsibility may also be switched at other times in the order. Then, the at least one line card 1 906-1 of the virtual partition A may be taken offline, as shown by the reference number (6).

Advantageously, as a result of the traffic direction module 1 960-1 directing traffic away from the line card 1 906-1, as shown by the reference number (3), the network determines the new route, as shown by the dashed lines and the reference numbers (4), prior to the at least one line card 1 906-1 of the virtual partition A being taken offline, as shown by the reference number (6). This may help to accelerate or improve the speed of traffic movement away from the line card 1 906-1 of the first virtual partition compared with the approach shown in FIG. 8 which relies on the network to detect that the at least one line card 1 906-1 of the virtual partition A has been taken offline and determine a new route.

Figure 10:
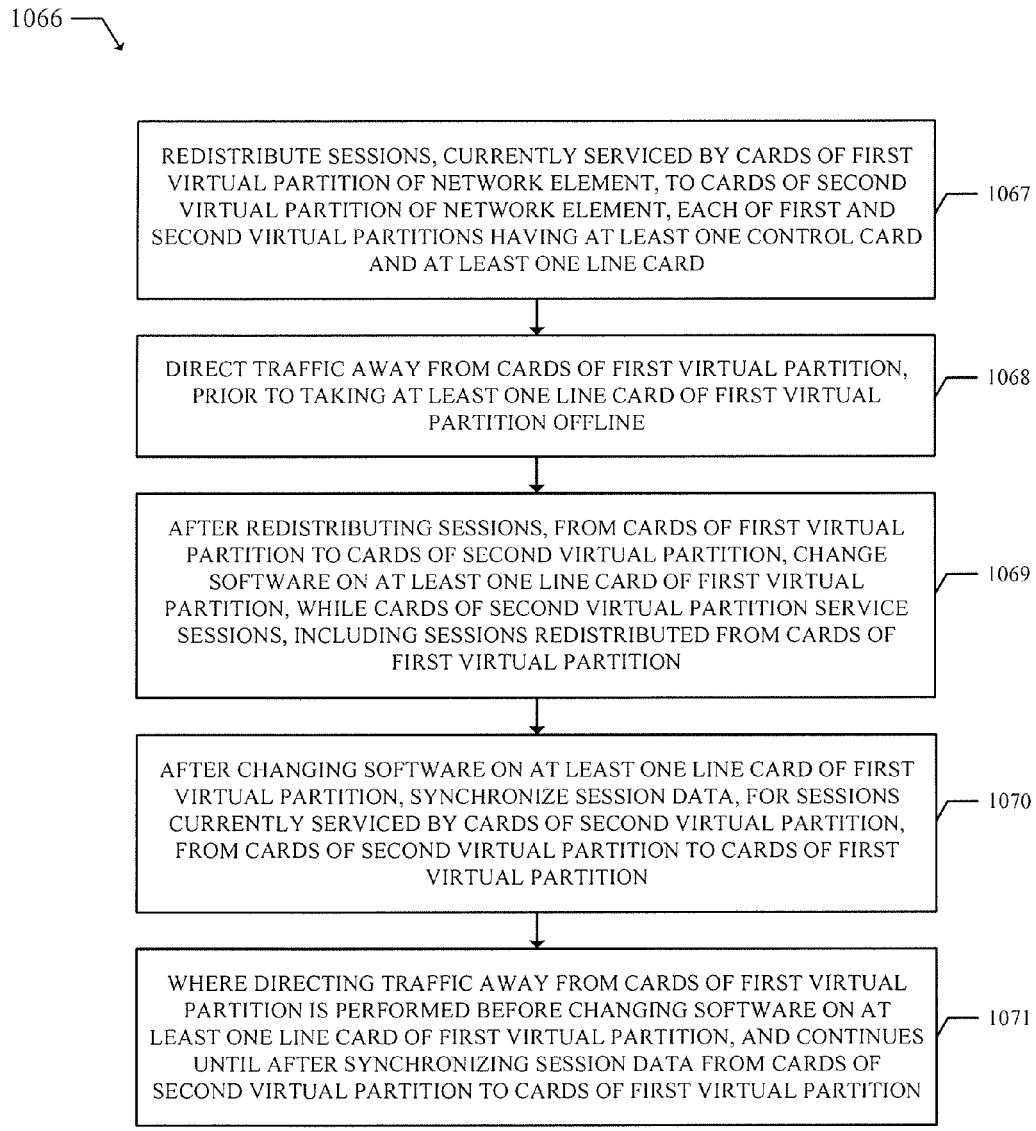
FIG. 10 is a block flow diagram illustrating an example embodiment of a method performed within a network element, for directing traffic away from cards of a first virtual partition, before changing software on the cards of the first virtual partition, until after the cards of the first virtual partition have session data, and while the network element services sessions.

FIG. 10 is a block flow diagram illustrating an example embodiment of a method 1066 performed within a network element, for directing traffic away from cards of a first virtual partition, before changing software on the cards of the first virtual partition, until after the cards of the first virtual partition have session data, and while the network element services sessions. In one embodiment, the method 1066 may be performed by the network element 600 of FIG. 6, additionally having one or more traffic direction modules 960 as shown in FIG. 9 coupled with an ISSU-MM, or a similar network element. Alternatively, the method 1066 may be performed by other network elements entirely.

At block 1067, sessions currently serviced by the cards of the first virtual partition of the network element, are redistributed to cards of a second virtual partition of the network element. Each of the first and second virtual partitions has at least one control card and at least one line card. In one aspect, all of the sessions currently serviced by the cards of the first virtual partition may be redistributed to the cards of the second virtual partition. In one aspect, the redistribution of the sessions may be the same as or similar to the redistribution of the sessions described for block 212 of FIG. 2.

Traffic may be directed or diverted away from the cards of the first virtual partition, prior to taking the at least one line card of the first virtual partition offline, at block 1068. In some embodiments, at least one line card of the first virtual partition may also be taken offline. In one embodiment, directing the traffic away from the cards of the first virtual partition may include influencing a routing protocol decision, such as, for example, by changing one or more routing protocol metrics to make a routing protocol metric corresponding to the cards of the first virtual partition inferior to or worse than a routing protocol metric corresponding to the cards of the second virtual partition. To an external network, this may make routing to the cards of the first virtual partition look unfavorable or undesirable, and the external network may stop routing traffic to the cards of the first virtual partition. A few representative examples of suitable metrics that may be changed include metrics for interior gateway routing via link-state routing protocols (e.g., metrics for Open Shortest Path First (OSPF) and Intermediate System to Intermediate System (IS-IS)), metrics for interior gateway routing via path vector or distance vector protocols (e.g., metrics for Routing Information Protocol (RIP), Interior Gateway Protocol(s) (IGP)), and metrics for exterior gateway routing (e.g., metrics for Border Gateway Protocol (BGP)), Label Distribution Protocol (LDP), Resource Reservation Protocol (RSVP)), and metrics for L2 protocols (e.g., Virtual Router Redundancy Protocol (VRRP) and Multi-Chassis Link Aggregation Group), etc. Often, the metrics may quantify or qualify the quality of routing to the cards, such as, for example, quantify a number of hops, quantify network congestion, quantify hop costs, etc. By way of example, to direct traffic away from a virtual partition, a metric may be adjusted to make, for example, a number of hops look excessively high, a network congestion look excessively bad, a hop cost look excessively high, etc.

As another option, in one embodiment, directing the traffic away from the cards of the first virtual partition may include actively notifying an external network that a network address of the at least one line card of the first virtual partition is withdrawn (e.g., already withdrawn, being withdrawn, or not presented). In one aspect, the actively notifying may be performed while the at least one line card of the first virtual partition is online, and has not failed or been taken offline. Moreover, in one aspect, the actively notifying may include actively telling the network, for example by sending a message, communication, or signal to a connected router, before actually taking the at least one line card of the first virtual partition offline. Advantageously, actively notifying the network that the address is withdrawn may convey this information faster than if the network had to detect the card being taken offline on its own.

Other approaches to redirect traffic are also possible. For example, as a further option, in one embodiment, directing the traffic away from the cards of the first virtual partition may be performed in a Layer 2 network using a Layer 2 protocol to control the traffic direction. By way of example, in Virtual Router Redundancy Protocol (VRRP), one Ethernet port may be assigned to the first virtual partition and another may be assigned to the second virtual partition, and the directing the traffic away from the cards of the first virtual partition may include directing the traffic away from the Ethernet port assigned to the first virtual partition. As another example, traffic direction may be achieved in Link Aggregation Group (LAG) based protocols, such as, for example, Link Aggregation Control Protocol (LACP), where multiple Ethernet links are aggregated together, and the multiple Ethernet links may be virtually partitioned and traffic may be directed away from one or more of the Ethernet links. Other examples may virtually partition other Layer 2 redundancy. Still further examples of directing traffic include those performed for Bidirectional Forwarding Detection (BFD) protocol.

Referring again to FIG. 10, after redistributing the sessions, from the cards of the first virtual partition, to the cards of the second virtual partition, the software is changed on, at least, the at least one line card of the first virtual partition, while the cards of the second virtual partition service sessions, including the sessions redistributed from the cards of the first virtual partition, at block 1069. In one aspect, the changing the software may be the same as or similar to the changing of the software described for block 213 of FIG. 2. For example, in one embodiment, changing the software on the at least one line card of the first virtual partition, and optionally on the at least one control card of the first virtual partition, may include changing at least one of field-programmable gate array (FPGA) software, application-specific integrated circuit (ASIC) software, kernel software, and microcode, and firmware. In one aspect, changing the software may include rebooting the cards on which the software is changed or upgraded. In one or more embodiments, the changing to the software may be accomplished without stalling user sessions or losing sessions or traffic.

In one or more embodiments, in addition to the at least one line card, software may also optionally be changed on at least one control card of the virtual partition A at block 213. Alternatively, as will be explained further below, the software may already have been changed on the at least one control card of the virtual partition A, for example if the at least one control card of the virtual partition A was a hot standby control card on which the software was previously upgraded. See e.g., the discussion associated with FIGS. 15-16.

After changing the software on the at least one line card of the first virtual partition, session data, for sessions currently serviced by the cards of the second virtual partition, is synchronized (e.g., moved or copied) from the cards of the second virtual partition to the cards of the first virtual partition, at block 1070. As qualified at block 1071, in one embodiment, the traffic is directed away from the cards of the first virtual partition before the software is changed on the at least one line card of the first virtual partition, and the traffic continues to be directed away from the cards of the first virtual partition until after the session data is synchronized, from the cards of the second virtual partition, to the cards of the first virtual partition. Advantageously, as previously discussed in conjunction with FIG. 9, directing the traffic away from the cards of the first virtual partition, before the software is changed on the at least one line card of the first virtual partition (e.g., the at least one line card is rebooted or otherwise taken offline), may help to improve the speed of traffic movement away from the cards of the first virtual partition and help to avoid session interruption.

Furthermore, and also advantageously, continuing to direct the traffic away from the cards of the first virtual partition, until after the session data is synchronized, from the cards of the second virtual partition, to the cards of the first virtual partition, may help to ensure that traffic does not appear at the cards of the just upgraded first virtual partition, until after the cards of the first virtual partition have been synchronized with session data to handle the traffic. If this was not done, then traffic may appear at a just upgraded card when it is brought back online, before there is session data to handle the traffic.

Figure 11:
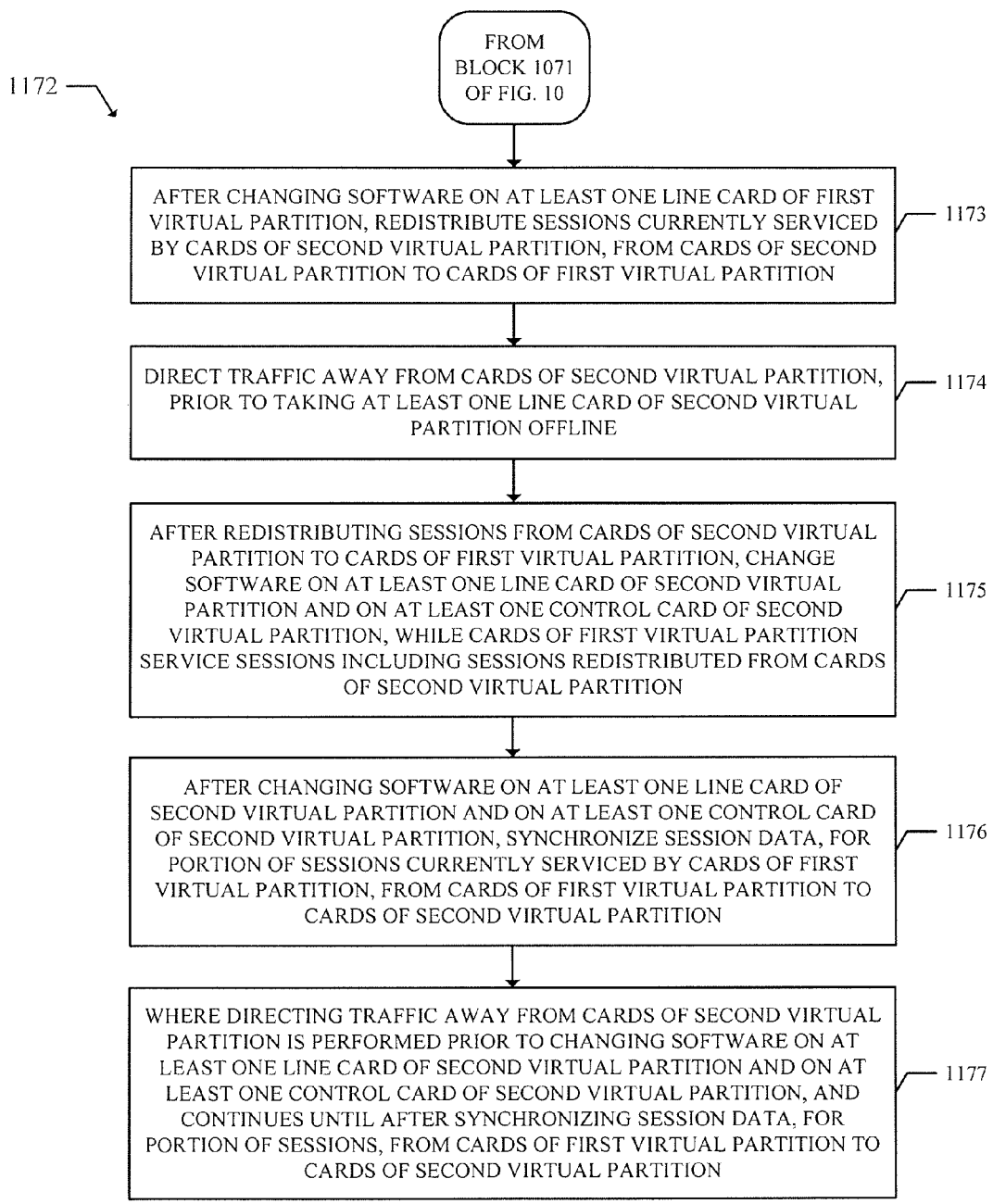
FIG. 11 is a block flow diagram illustrating an example embodiment of a method, which is a continuation of the method of FIG. 10, for directing traffic away from cards of a second virtual partition, before changing software on the cards of the second virtual partition, and until after the cards of the second virtual partition have session data.

FIG. 11 is a block flow diagram illustrating an example embodiment of a method 1172, which is a continuation of the method 1066 of FIG. 10, for directing traffic away from cards of a second virtual partition, before changing software on the cards of the second virtual partition, and until after the cards of the second virtual partition have session data. The method 1172 commences after the operations of block 1071.

At block 1173, after changing the software on the at least one line card of the first virtual partition, sessions currently serviced by the cards of the second virtual partition may be redistributed, from the cards of the second virtual partition, to the cards of the first virtual partition. In one aspect, all of the sessions currently serviced by the cards of the second virtual partition, which in one embodiment is all of the sessions currently serviced by the network element, may be redistributed to the cards of the first virtual partition. In one aspect, the redistribution of the sessions may be the same as or similar to the redistribution of the sessions described for block 214 of FIG. 2.

In one embodiment, redistributing the sessions may include translating sessions (e.g., translating session data) that are synchronized from the not-yet-changed control card software of the control card of the second virtual partition to the already-changed control card software of the control card of the first virtual partition, and providing the translated session data from the control card of the first virtual partition to the line card of the first virtual partition. In one aspect, the control card of the second virtual partition may not communicate or provide session data directly to the line card of the first virtual partition. Advantageously, this may help to avoid translation complexity, by avoiding the need to translate the session data from the not-yet-changed control card software of the control card of the second virtual partition to the already-changed line card software of the line card of the first virtual partition.

Traffic may be directed away from the cards of the second virtual partition, prior to taking the at least one line card of the second virtual partition offline, at block 1174. In some embodiments, at least one line card of the second virtual partition may also be taken offline. The traffic direction may be achieved as previously described. In one embodiment, the traffic may be directed away from the cards of the second virtual partition by influencing a routing protocol decision. For example, a BGP attribute may be manipulated to divert traffic away from the cards of the second virtual partition. In another embodiment, the traffic may be directed away from the cards of the second virtual partition by actively withdrawing a network address. In yet another embodiment, the traffic may be directed away from the cards of the second virtual partition in a Layer 2 network through a Layer 2 protocol (e.g., VRRP or LACP) to control the traffic direction.

After redistributing the sessions from the cards of the second virtual partition to the cards of the first virtual partition, software is changed on the at least one line card of the second virtual partition, and on the at least one control card of the second virtual partition, while the cards of the first virtual partition service sessions, including the sessions redistributed from the cards of the second virtual partition, at block 1175. In one aspect, the changing of the software may be the same as or similar to the changing of the software described for block 215 of FIG. 2. For example, in one embodiment, changing the software on the control and/or line cards of the second virtual partition may include changing at least one of field-programmable gate array (FPGA) software, application-specific integrated circuit (ASIC) software, kernel software, and microcode, and firmware. In one aspect, changing the software may include rebooting the cards on which the software is changed or upgraded. In one or more embodiments, the changing to the software may be accomplished without losing or stalling user sessions.

After changing the software on the at least one line card of the second virtual partition, and on the at least one control card of the second virtual partition, session data is synchronized, for a portion of sessions currently serviced by the cards of the first virtual partition, from the cards of the first virtual partition, to the cards of the second virtual partition, at block 1176. As qualified at block 1177, in one embodiment, the traffic is directed away from the cards of the second virtual partition before the software is changed on the cards of the second virtual partition, and the traffic continues to be directed away from the cards of the second virtual partition until after synchronizing the session data, for the portion of the sessions, from the cards of the first virtual partition to the cards of the second virtual partition.

Advantageously, directing the traffic away from the cards of the second virtual partition before the software is changed on the cards of the second virtual partition, (e.g., the cards are rebooted or otherwise taken offline), may help to improve the speed of traffic movement away from the cards of the second virtual partition and help to avoid session interruption. Furthermore, continuing to direct the traffic away from the cards of the second virtual partition, until after synchronizing the session data to the cards of the second virtual partition, may help to ensure that traffic does not appear at the cards of the second virtual partition, until after the cards of the second virtual partition have been synchronized with session data to handle the traffic.

Other operations (not shown) may also optionally be performed. For example, traffic direction may be used to balance or equalize sessions on the cards of the network element, according to their ability to handle the sessions (e.g., based on load balancing). In one example, equal or approximately equal routing protocol metrics or attributes may be announced for the cards corresponding to each of the virtual partitions. This may tend to make approximately half of the traffic go to each virtual partition. The virtual partitions may be eliminated and the network element may service traffic at all of the cards using the now upgraded or otherwise changed software.

Figure 12:
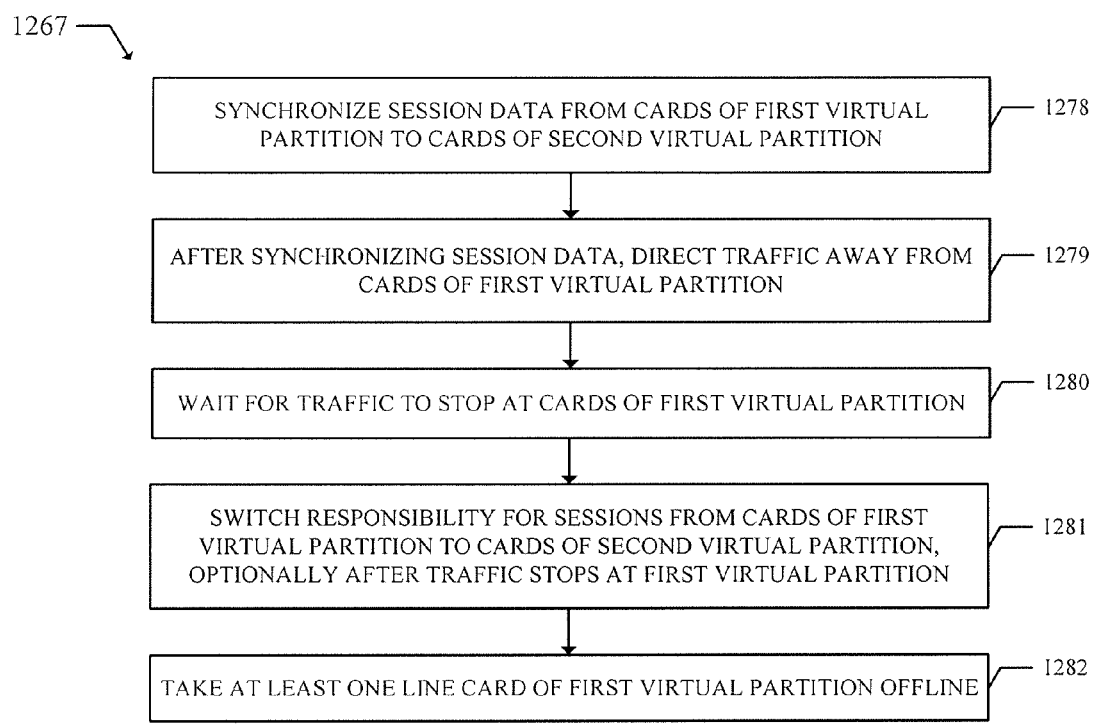
FIG. 12 is a block flow diagram illustrating an example embodiment of a method for redistributing sessions currently serviced by cards of a first virtual partition of a network element to cards of a second virtual partition of the network element that includes directing traffic away from the cards of the first virtual partition.

FIG. 12 is a block flow diagram illustrating an example embodiment of a method 1267 for redistributing sessions currently serviced by cards of a first virtual partition of a network element to cards of a second virtual partition of the network element. The method 1267 represents one example embodiment of a set of operations suitable for the block 1067 of FIG. 10.

At block 1278, session data for the sessions currently serviced by the cards of the first virtual partition is synchronized to the cards of the second virtual partition. Then, after synchronizing the session data, traffic may be directed away from the cards of the first virtual partition, at block 1279. This may be achieved using the traffic direction methods previously described (e.g., by influencing a routing protocol decision or actively withdrawing a network address or through a Layer 2 network protocol). At block 1280, the method may wait until the traffic stops at the cards of the first virtual partition. Responsibility for sessions may be switched from the cards of the first virtual partition to the cards of the second virtual partition, optionally after the traffic has stopped at the first virtual partition, at block 1281. Then, after the traffic has stopped at the cards of the first virtual partition, the at least one line card of the first virtual partition may be taken offline, at block 1282.

Figure 13:
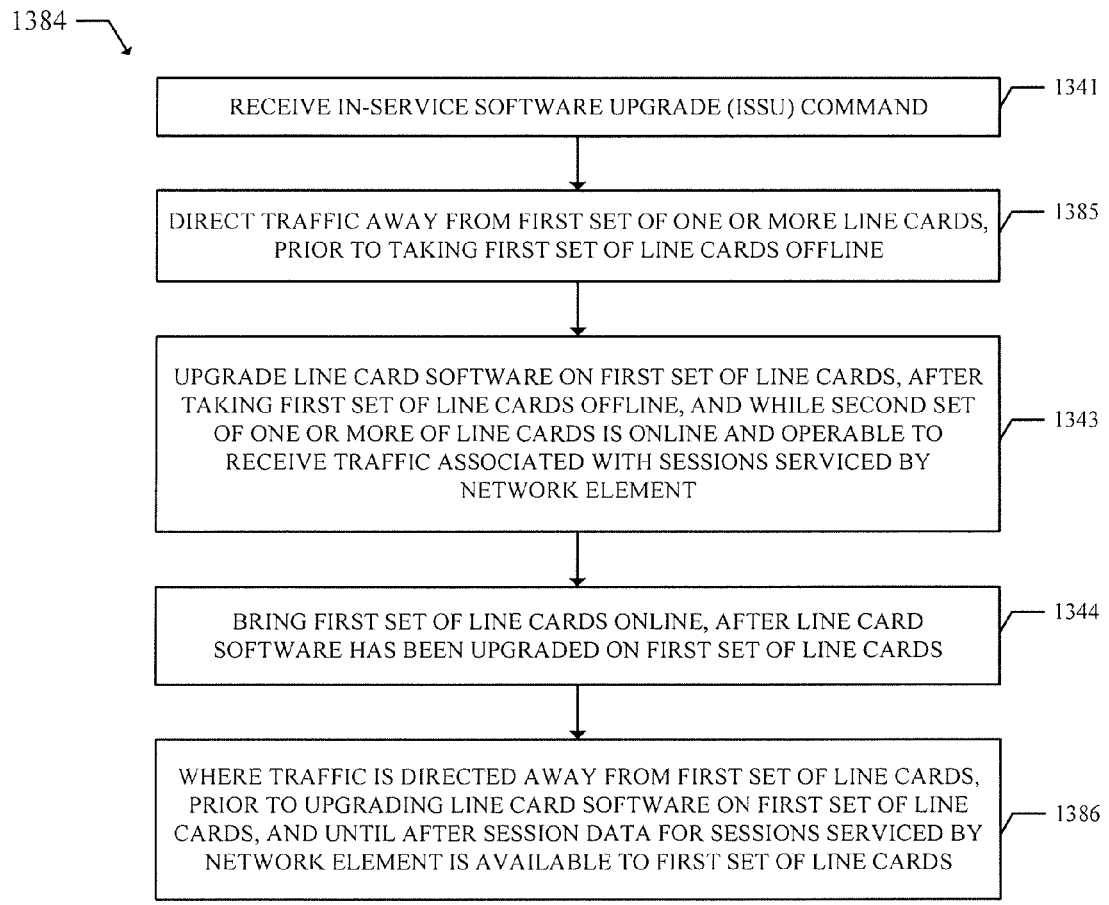
FIG. 13 is a block flow diagram illustrating another example embodiment of a method that may be performed by a network element, from a perspective taken outside of the network element, to direct traffic away from a first set of line cards, before upgrading software on the first set of line cards, until after the first set of line cards have session data, and while the network element services sessions.

FIG. 13 is a block flow diagram illustrating another example embodiment of a method 1384 that may be performed by a network element, from a perspective taken outside of the network element, to direct traffic away from a first set of one or more line cards, before upgrading software on the first set of the line cards, until after the first set of the line cards have session data, and while the network element services sessions.

At block 1341, an ISSU command may be received at an interface of the network element. The ISSU command may be received as described elsewhere herein (e.g., through a command line interface). The network element may perform the remaining operations of the method in response to, or as a result of, the receipt of the ISSU command.

Traffic is directed away from a first set of one or more line cards of the network element, prior to taking the first set of the line cards offline, at block 1385. This may be achieved using the approaches previously described.

Line card software is upgraded on the first set of the line cards, after taking the first set of the line cards offline, and while a second set of one or more of the line cards is online and operable to receive traffic associated with the sessions serviced by the network element, at block 1343. In some embodiments, control card software on one or more control cards may also be upgraded. If desired, a network administrator or other practitioner may optionally be able to confirm that the line card software has been upgraded on the first set of the line cards, for example, by issuing a command through a command line interface (CLI) or other management interface to query for attributes of the line card software, although the scope of the invention is not limited in this respect.

Then, the first set of the line cards is brought back online, after the line card software has been upgraded on the first set of the line cards, at block 1344. As qualified at block 1386, in one embodiment, the traffic is directed away from the first set of the line cards, prior to upgrading the line card software on the first set of the line cards, and until after the session data for the sessions serviced by the network element is available to the first set of the line cards.

Advantageously, directing the traffic away from the first set of the line cards, prior to taking the first set of the line cards offline, may help to improve the speed of traffic movement away from the first set of the line cards and help to avoid session interruption. Furthermore, continuing to direct the traffic away from the first set of the line cards until after session data to handle the traffic is available to the first set of the line cards, may help to ensure that traffic does not appear at the first set of the line cards, until they have been synchronized with session data to handle the traffic.

Figure 14:
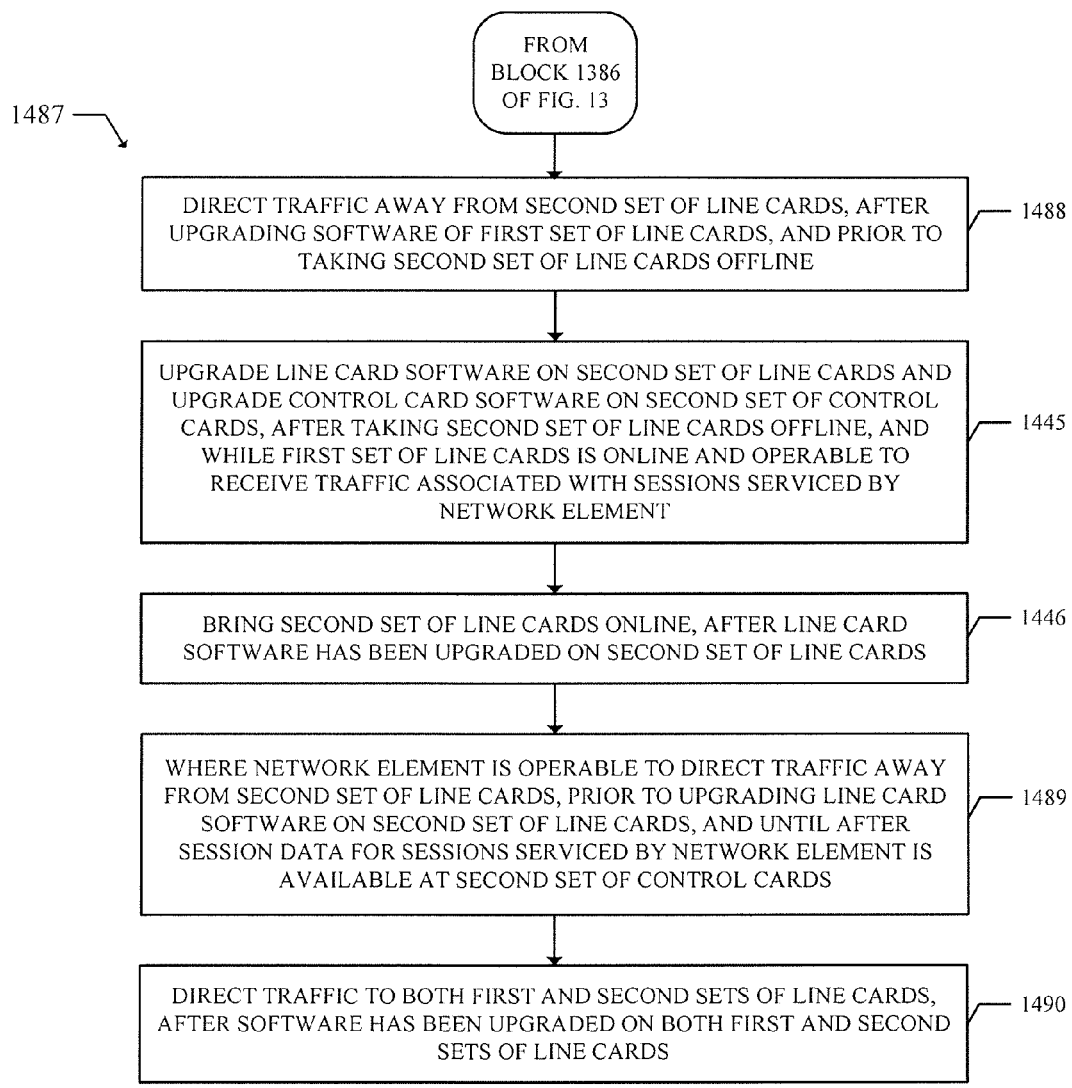
FIG. 14 is a block flow diagram illustrating an example embodiment of a method, which is a continuation of the method of FIG. 13, for directing traffic away from a second set of line cards, prior to upgrading software on the second set of line cards, and until after session data is available.

FIG. 14 is a block flow diagram illustrating an example embodiment of a method 1487, which is a continuation of the method 1384 of FIG. 13, for directing traffic away from the second set of line cards of the network element, prior to upgrading the software on the second set of line cards, and until after session data is available. The method 1487 is also taken from a perspective outside of the network element. The method 1487 commences after the operations of block 1386 of FIG. 13.

At block 1488, traffic is directed away from the second set of the line cards, after upgrading the software of the first set of the line cards (e.g. at block 1343 of FIG. 13), and prior to taking the second set of the line cards offline.

The line card software is upgraded on the second set of the line cards and the control card software is upgraded on a second set of control cards, after taking the second set of the line cards offline, and while the first set of the line cards is online and operable to receive traffic associated with the sessions serviced by the network element, at block 1445. In some embodiments, control card software on one or more control cards may also be upgraded.

Then, the second set of the line cards are brought back online, after the line card software has been upgraded on the second set of the line cards, at block 1446. As qualified at block 1489, in one embodiment, the traffic is directed away from the second set of the line cards, prior to upgrading the line card software on the second set of the line cards, and until after session data for the sessions serviced by the network element is available at the second set of the control cards. This may provide the advantages previously mentioned.

Then, traffic may be directed to both the first and second sets of the line cards, after the software has been upgraded on both the first and second sets of the line cards, at block 1490. In one aspect, this may be done to achieve load balancing or load distribution, such that each of the line cards handles the loads according to its ability. By way of example, equal or substantially equal routing protocol metrics may be announced or otherwise provided for each of the first and the second sets of the line cards.

The ISSU methods and apparatus described herein are suitable for network elements having various different types of control planes. To further illustrate certain concepts, two example embodiments of different types of control planes which are suitable will be described. Other types of control planes are also suitable. The methods shown, for example, in FIGS. 2, 7, 10, and 13, may be performed on these different types of control planes. All of the steps of these methods will not be repeated again, but rather the description below will tend to emphasize the new or different aspects.

FIG. 15 is a block diagram illustrating an example embodiment of a network element 1500 having a first example embodiment of a control plane 1504. The control plane includes an active control card 1504-1 and a standby control card 1504-2. The active and standby control cards are coupled together. The network element may provide for 1:1 redundancy for control plane processes. The active control card may synchronize with the standby control card. The standby control card may mirror the active control card, and assume the role of the active control card if the active control card fails. Typically, when acting as a standby control card, the standby control card does not actively perform signaling or process control messages. The network element also includes line cards, including at least a line card 1 1506-1 and a line card N 1506-N, and optionally one or more other line cards. The line cards are coupled with the control cards, and the line cards are coupled together. The control cards and the line cards of the network element may belong to, or be coupled with, a single physical chassis 1502.

Each of the active and standby control cards have an ISSU system 1509. The software on the standby control card may be upgraded. In one embodiment, this is performed after redistributing sessions currently serviced by cards of a virtual partition of which the standby control card belongs to cards of another virtual partition (e.g., after block 212 of FIG. 2). After the software on the standby control card is upgraded, the upgraded control card is made active instead of standby. Alternatively, the software on the standby control card may be upgraded before redistributing the sessions (e.g., before block 212 of FIG. 2) but the standby control card may not be made active until after the redistribution of the sessions. At making the standby card active, there are two active control cards. Due to the redistribution of the sessions, the upgraded active control card does not have any sessions on its virtual partition yet, so there is no translation from already-upgraded control card to not-yet-upgraded line card software needed. Then, the line card software on the line cards in the virtual partition having the already-upgraded control card 1504-2 (i.e., the former standby control card) may be upgraded or changed. The remainder of the ISSU may proceed substantially as described previously, and from this point on during the ISSU, each of the active control cards may only talk to line cards within the same virtual partition. There may be stateful data translation between the active control cards on the virtual partitions. In the active-active mode, each of the control cards, when servicing sessions, may exchange messages associated with the sessions with an external network.

FIG. 16 is a block diagram illustrating an example embodiment of a network element 1600 having a second example embodiment of a control plane, which is a distributed control plane 1692. The distributed control plane includes an active primary control card 1604-1, a standby primary control card 1604-2, at least one secondary control card 1 1690-1, and optionally at least one additional secondary control card M 1690-M. The control cards are coupled together. The standby primary control card may mirror the active primary control card, and serve as a hot backup in case the active primary control card fails. The primary control cards may include, for example, Cross-Connect Route Processor (XCRP) cards or other standard control cards. The secondary control cards may include, for example, either XCRP cards, feature cards, Advanced Service Engine (ASE) cards. Alternatively, line cards may be used in place of the secondary control cards. Alternatively, instead of cards the secondary control cards may be replaced by cores of an XCRP card, feature card, ASE card, or other card. During operation, the active primary control card may provide distributed control plane process instances to the secondary control cards. The control cards all run in active mode and receives and processes and sends signaling messages for sessions. There are typically no backup or redundant secondary control cards. In one aspect, session redundancy is supported in a way that each session is active on one control card and is passive or backup on another control card. There is stateful synchronization from the active control card to the passive control card on a per-session basis. The network element also includes line cards, including at least a line card 1 1606-1 and a line card N 1606-N, and optionally one or more other line cards. The line cards are coupled with the control cards, and the line cards are coupled together. The control cards and the line cards of the network element may belong to, or be coupled with, a single physical chassis 1602.

Each of the active and standby primary control cards have an ISSU system 1609. The software on the standby primary control card may be upgraded. In one embodiment, this is performed after redistributing sessions currently serviced by cards of a virtual partition of which the standby primary control card belongs to cards of another virtual partition (e.g., after block 212 of FIG. 2). After the software on the standby primary control card is upgraded, the upgraded primary control card is made active instead of standby. Alternatively, the software on the standby primary control card may be upgraded before redistributing the sessions (e.g., before block 212 of FIG. 2), but the standby primary control card may not be made active until after the redistribution of the sessions. After making the standby primary card active, there are two active primary control cards. Due to the redistribution of the sessions, the upgraded active primary control card does not have any sessions on its virtual partition yet, so there is no translation from already-upgraded control card to not-yet-upgraded line card software needed. Then, the line card software on the line cards in the virtual partition having the already-upgraded primary control card 1604-2 (i.e., the former standby primary control card) may be upgraded or changed. The remainder of the ISSU may proceed substantially as described previously, and from this point on during the ISSU, each of the active primary control cards may only talk to secondary control cards and line cards within the same virtual partition. There may be stateful data translation between the active primary control cards on the virtual partitions. In the active-active mode, each of the primary control cards when servicing sessions may exchange messages associated with the sessions with an external network. For example, in one embodiment, a primary control card of a particular virtual partition, while servicing sessions, after the line card software has been changed on line cards of another virtual partition, may provide distributed control plane process instances to only one or more secondary control cards within the particular virtual partition, and not to any secondary control cards within the other virtual partition.

Alternative Embodiments

While embodiments have been described in relation to two virtual partitions, other embodiments may utilize three or more virtual partitions. Therefore, embodiments are not limited to two or any known number of virtual partitions. In addition, while embodiments have been described in relation to creating an eliminating a virtual partition, alternative embodiments could be implemented such that the control and line cards of a network element are virtually partitioned before and after the ISSU (e.g., constantly virtually partitioned). Further, while embodiments show control separate cards and line cards, alternative embodiments may have alternate card arrangements (e.g., a combined line and control card with one or more ports and a forwarding engine).

While the flow diagrams in the figures show a particular order of operations performed by certain embodiments of the methods, it should be understood that such order is exemplary (e.g., alternative embodiments may perform the operations in a different order, combine certain operations, overlap certain operations, etc.).

Other Matters

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

What is claimed is:

1. A method performed within a network element, for directing traffic away from cards of a first virtual partition, before changing software on the cards of the first virtual partition, until after the cards of the first virtual partition have session data, and while the network element services sessions, the method comprising:
    redistributing sessions, currently serviced by the cards of the first virtual partition of the network element, to cards of a second virtual partition of the network element, each of the first and second virtual partitions having at least one control card and at least one line card;
    performing the directing the traffic away from the cards of the first virtual partition, prior to taking the at least one line card of the first virtual partition offline; after the redistributing the sessions, from the cards of the first virtual partition to the cards of the second virtual partition, performing the changing the software on the at least one line card of the first virtual partition, while the cards of the second virtual partition service sessions, including the sessions redistributed from the cards of the first virtual partition; and
    after the changing the software on the at least one line card of the first virtual partition, synchronizing session data, for sessions currently serviced by the cards of the second virtual partition, from the cards of the second virtual partition to the cards of the first virtual partition,
    wherein the directing the traffic away from the cards of the first virtual partition is performed before the changing the software on the at least one line card of the first virtual partition, and continues until after the synchronizing the session data from the cards of the second virtual partition to the cards of the first virtual partition,
    whereby speed of traffic movement away from the cards of the first virtual partition is increased by the directing of the traffic away from the first virtual partition prior to the taking of the at least one line card of the first virtual partition offline, and the traffic is directed away from the cards of the first virtual partition until after the cards of the first virtual partition have session data to handle the traffic.

2. The method of claim 1, wherein the directing the traffic away from the cards of the first virtual partition comprises influencing a routing protocol decision.

3. The method of claim 2, wherein the influencing the routing protocol decision comprises changing one or more routing protocol metrics to make a routing protocol metric corresponding to the cards of the first virtual partition inferior to a routing protocol metric corresponding to the cards of the second virtual partition.

4. The method of claim 1, wherein the directing the traffic away from the first virtual partition comprises actively notifying an external network that a network address of the at least one line card of the first virtual partition is withdrawn.

5. The method of claim 1, further comprising:
    after the changing the software on the at least one line card of the first virtual partition, redistributing the sessions currently serviced by the cards of the second virtual partition, from the cards of the second virtual partition to the cards of the first virtual partition;
    directing traffic away from the cards of the second virtual partition, prior to taking the at least one line card of the second virtual partition offline;
    after the redistributing the sessions from the cards of the second virtual partition to the cards of the first virtual partition, changing software on the at least one line card of the second virtual partition and on the at least one control card of the second virtual partition, while the cards of the first virtual partition service sessions including the sessions redistributed from the cards of the second virtual partition,
    after the changing the software on the at least one line card of the second virtual partition and on the at least one control card of the second virtual partition, synchronizing session data, for a portion of sessions currently serviced by the cards of the first virtual partition, from the cards of the first virtual partition to the cards of the second virtual partition,
    wherein the directing the traffic away from the cards of the second virtual partition is performed prior to the changing the software on the at least one line card of the second virtual partition and on the at least one control card of the second virtual partition, and continues until after the synchronizing the session data, for the portion of the sessions, from the cards of the first virtual partition to the cards of the second virtual partition.

6. The method of claim 1, wherein the network element is configured to use a distributed control plane, wherein the at least one control card of the second virtual partition comprises a primary control card and one or more secondary control cards that receive distributed control plane process instances from the primary control card, and the method further comprises:

the primary control card of the second virtual partition, while servicing the sessions after the changing the software on the at least one line card of the first virtual partition, providing the distributed control plane process instances to only the one or more secondary control cards of the second virtual partition, and not to any secondary control cards within the first virtual partition.

7. The method of claim 1, wherein the servicing of the sessions with the cards of the second virtual partition, after the changing the software on the at least one line card of the first virtual partition, comprises the at least one control card of the second virtual partition communicating with line cards only in the second virtual partition, and not with line cards in the first virtual partition.

8. The method of claim 1, wherein the changing the software on the at least one line card of the first virtual partition comprises changing at least one of field-programmable gate array (FPGA) software, application-specific integrated circuit (ASIC) software, kernel software, and microcode.

9. The method of claim 1, further comprising receiving an in-service software upgrade (ISSU) command that specifies that the first virtual partition is to have the at least one control card of the first virtual partition and the at least one line card of the first virtual partition, and that specifies that the second virtual partition is to have the at least one control card of the second virtual partition and the at least one line card of the second virtual partition, and wherein the method is performed responsive to receipt of the ISSU command.

10. The method of claim 1, further comprising, after the changing the software on the at least one line card of the first virtual partition:

translating the session data that is synchronized from the not yet changed software of the at least one control card of the second virtual partition to the already changed software of the at least one control card of the first virtual partition; and providing the translated session data from the at least one control card of the first virtual partition to the at least one line card of the first virtual partition, whereby translation complexity is avoided by avoiding translating sessions from the not yet changed software of the at least one control card of the second virtual partition to the already changed software of the at least one line card of the first virtual partition.

11. A network element having a plurality of line cards, that is operable to direct traffic away from a first set of the plurality of line cards, before upgrading software on the first set of the plurality of line cards, until after the first set of the plurality of line cards have session data, and while the network element services sessions, the network element comprising:

a plurality of control cards coupled together;

the plurality of line cards coupled with the control cards and coupled together, wherein each of the plurality of line cards have line card software;

an interface to receive an in-service software upgrade (ISSU) command; and an ISSU system that, responsive to the ISSU command, is operable to cause the network element to:

direct traffic away from the first set of the plurality of line cards, prior to taking the first set of the plurality of line cards offline;

upgrade the line card software on the first set of the plurality of line cards, after taking the first set of the plurality of line cards offline, and while a second set of the plurality of the line cards is online and operable to receive traffic associated with the sessions serviced by the network element;

bring the first set of the plurality of line cards online, after the line card software has been upgraded on the first set of the plurality of line cards, wherein in directing the traffic away from the first set of the plurality of line cards, the network element is operable to direct the traffic away from the first set of the plurality of line cards, prior to upgrading the line card software on the first set of the plurality of line cards, and until after the session data for the sessions serviced by the network element is available to the first set of the plurality of line cards, whereby speed of traffic movement away from the first set of the plurality of line cards is increased by the directing of the traffic away from the first set of the plurality of line cards, prior to taking the first set of the plurality of line cards offline, and the traffic is directed away from the first set of the plurality of line cards until after session data to handle the traffic is available to the first set of the plurality of line cards.

12. The network element of claim 11, wherein the network element is operable to direct the traffic away from the first set of the plurality of line cards by influencing a routing protocol decision.

13. The network element of claim 12, wherein the network element is operable to influence the routing protocol decision by changing one or more routing protocol metrics to make a routing protocol metric corresponding to the first set of the plurality of line cards inferior to a routing protocol metric corresponding to the second set of the plurality of line cards.

14. The network element of claim 11, wherein the network element is operable to direct the traffic away from the first set of the plurality of line cards by actively notifying an external network that one or more network addresses corresponding to the first set of the plurality of line cards are withdrawn.

15. The network element of claim 11, wherein the network element, responsive to the ISSU command, is further operable to:

direct traffic away from the second set of the plurality of line cards, after upgrading the software of the first set of the plurality of line cards, and prior to taking the second set of the plurality of line cards offline;

upgrade the line card software on the second set of the plurality of line cards and upgrade control card software on a second set of the plurality of control cards, after taking the second set of the plurality of line cards offline, and while the first set of the plurality of line cards is online and operable to receive traffic associated with the sessions serviced by the network element;

bring the second set of the plurality of line cards online, after the line card software has been upgraded on the second set of the plurality of line cards, wherein the network element is operable to perform the directing of the traffic away from the second set of the plurality of line cards, prior to upgrading the line card software on the second set of the plurality of line cards, and until after session data for the sessions serviced by the network element is available at the second set of the plurality of control cards; and direct traffic to both the first and second sets of the plurality of line cards, after the software has been upgraded on both the first and second sets of the plurality of line cards.

16. The network element of claim 11, wherein the first set of the plurality of line cards provides connections to all different external networks for which connections are provided by the second set of the plurality of line cards, and wherein the second set of the plurality of line cards provides connections to all different external networks for which connections are provided by the first set of the plurality of line cards.

17. The network element of claim 11, wherein the ISSU command associates the first set of the plurality of line cards as a group and associates the second set of the plurality of line cards as a group.

18. The network element of claim 11, wherein the upgrade of the line card software on the first set of the plurality of line cards comprises an upgrade of at least one of field-programmable gate array (FPGA) software, application-specific integrated circuit (ASIC) software, kernel software, and microcode.

19. The network element of claim 11, wherein the network element is operable to take the first set of the plurality of line cards offline after traffic to the first set of the plurality of line cards has stopped.

20. The network element of claim 11, wherein the network element is operable to perform the upgrade of the software on the first set of the plurality of line cards without stalling sessions that were previously serviced by the first set of the plurality of line cards.

* * * * *

UNITED STATES PATENT AND TRADEMARK OFFICE
CERTIFICATE OF CORRECTION

PATENT NO. : 8,402,454 B2  
APPLICATION NO. : 12/888405  
DATED : March 19, 2013  
INVENTOR(S) : Wang et al.

Page 1 of 1

It is certified that error appears in the above-identified patent and that said Letters Patent is hereby corrected as shown below:

On the Title Page, in item (56), under "OTHER PUBLICATIONS", in Column 2, Line 2, delete "al," and insert -- al., --, therefor.

Title Page 2, in item (56), under "OTHER PUBLICATIONS", in Column 2, Lines 2-3, delete "Zhang yi ' yi et al," and insert -- Zhang yi et al., --, therefor.

In the Specification

In Column 4, Line 20, delete "DESCRIPTION" and insert -- DETAILED DESCRIPTION --, therefor.

In Column 10, Line 43, delete "mentioned" and insert -- mentioned. --, therefor.

In Column 18, Line 23, delete "an network" and insert -- a network --, therefor.

Signed and Sealed this  
Twenty-second Day of October, 2013

Teresa Stanek Rea  
*Deputy Director of the United States Patent and Trademark Office*